United States Patent
Nishiura et al.

(10) Patent No.: US 8,123,292 B2
(45) Date of Patent: Feb. 28, 2012

(54) VEHICLE SEAT

(75) Inventors: Takeshi Nishiura, Nissin (JP); Seiya Nishimura, Okazaki (JP); Koji Hayashi, Nagoya (JP); Atsuki Sasaki, Nagoya (JP)

(73) Assignee: Toyota Boshoku Kabushiki Kaisha, Aichi-ken (JP)

( * ) Notice: Subject to any disclaimer, the term of this patent is extended or adjusted under 35 U.S.C. 154(b) by 435 days.

(21) Appl. No.: 12/438,784

(22) PCT Filed: Jun. 29, 2007

(86) PCT No.: PCT/JP2007/063113
§ 371 (c)(1),
(2), (4) Date: May 6, 2009

(87) PCT Pub. No.: WO2008/026372
PCT Pub. Date: Mar. 6, 2008

(65) Prior Publication Data
US 2009/0322126 A1    Dec. 31, 2009

(30) Foreign Application Priority Data
Aug. 31, 2006  (JP) ................. 2006-235353
Aug. 31, 2006  (JP) ................. 2006-235359

(51) Int. Cl.
*B60N 2/48*    (2006.01)
(52) U.S. Cl. ................................. 297/216.12
(58) Field of Classification Search ............ 297/216.12, 297/408
See application file for complete search history.

(56) References Cited

U.S. PATENT DOCUMENTS

| 6,082,817 | A | 7/2000 | Muller | |
|---|---|---|---|---|
| 6,688,697 | B2 | 2/2004 | Baumann et al. | |
| 6,749,256 | B1 | 6/2004 | Klier et al. | |
| 7,048,336 | B2 | 5/2006 | Mawbey et al. | |
| 7,073,856 | B2 | 7/2006 | Akaike et al. | |
| 7,611,196 | B2 * | 11/2009 | Terada et al. | 297/216.12 |
| 7,717,507 | B2 * | 5/2010 | Toda et al. | 297/216.12 |

(Continued)

FOREIGN PATENT DOCUMENTS

DE    197 07 998 A1    9/1998

(Continued)

OTHER PUBLICATIONS

English language Abstract of DE 197 07 998 A1, Sep. 17, 1998.

(Continued)

*Primary Examiner* — Anthony D Barfield
(74) *Attorney, Agent, or Firm* — Greenblum & Bernstein, P.L.C.

(57) ABSTRACT

A headrest moving mechanism includes linking members that links a support portion and a headrest base portion to each other; and elongated holes formed in the headrest base portion. The elongated holes slidably receive a connection shaft provided to the support portion, thereby determining a postural position of the support portion. The elongated holes are shaped so as to move the support portion forwardly and upwardly with respect to the headrest base portion from an initial position in a time before the vehicle back-side collision happens to a collision preparatory position as the linking members are rotated.

4 Claims, 16 Drawing Sheets

U.S. PATENT DOCUMENTS

| | | | |
|---|---|---|---|
| 7,717,508 B2 * | 5/2010 | Becker et al. | 297/216.12 |
| 2005/0046262 A1 | 3/2005 | Mawbey et al. | |
| 2008/0246323 A1 | 10/2008 | Kuno | |
| 2008/0252128 A1 | 10/2008 | Nishikawa et al. | |
| 2009/0102266 A1 | 4/2009 | Furukawa et al. | |
| 2009/0126520 A1 | 5/2009 | Yamaguchi et al. | |

FOREIGN PATENT DOCUMENTS

| | | |
|---|---|---|
| DE | 10054793 | 5/2001 |
| DE | 20114944 | 1/2003 |
| DE | 10224060 | 7/2003 |
| DE | 10335268 | 12/2004 |
| DE | 10 2004 043 490 | 3/2005 |
| JP | 2002-142910 A | 5/2002 |
| JP | 2006-027593 A | 2/2006 |

OTHER PUBLICATIONS

English language Abstract of JP 2002-142910 A, May 21, 2002.
English language Abstract of DE 10 2004 043 490 A1, Mar. 31, 2005.
English language. Abstract of JP 2006-027593 A, Feb. 2, 2006.
U.S. Appl. No. 12/210,529 to Furukawa et al., filed Sep. 15, 2008.
U.S. Appl. No. 12/259,612 to Suzuki et al., filed Oct. 28, 2008.
U.S. Appl. No. 12/356,866 to Abe, filed Jan. 21, 2009.
U.S. Appl. No. 12/438,861 to Shimizu et al., filed Feb. 25, 2009.
U.S. Appl. No. 12/438,870 to Shimizu et al., filed Feb. 25, 2009.
U.S. Appl. No. 12/415,025 to Matsui, filed Mar. 31, 2009.
U.S. Appl. No. 12/426,540 to Otsuka, filed Apr. 20, 2009.
Extended European Search Report dated Jan. 5, 2010 that issued with respect to patent family member European Patent Application No. 07767900.9.

* cited by examiner

VEHICLE SEAT

TECHNICAL FIELD

The present invention relates to a vehicle seat. More particularly, the present invention relates to a vehicle seat having a headrest moving mechanism that is capable of moving a support portion of a headrest for supporting a head of a sitting person with respect to a seat back when a vehicle back-side collision is detected, thereby placing the support portion closer to the head.

BACKGROUND ART

Conventionally, there is a vehicle seat having a mechanism that is capable of instantaneously moving a headrest forwardly so as to support a head of a sitting person when a vehicle back-side collision happens. For example, Japanese Laid-Open Patent Publication No. 2002-142910 teaches a technique in which a support portion for supporting a head is moved forwardly from a headrest base portion using a four-joints link mechanism.

In this disclosure, the four-joints link mechanism is constructed of two parallel links that are disposed between the headrest base portion and the support portion. The two parallel links are retained in a postural condition in which the support portion is retracted toward the headrest base portion when the vehicle back-side collision does not yet happen. When the vehicle back-side collision happens, the condition is released. Upon release of the condition, the two parallel links is rotated so as to move the support portion forwardly by a biasing force.

DISCLOSURE OF THE INVENTION

Problem to be Solved by the Invention

However, in the conventional technique taught by the above-mentioned document, a mechanism for moving the support portion forwardly needs a plurality of linking members and connecting members. This may lead to increased number of parts and increased weight.

The present invention has been made in order to solve the above-mentioned problem. It is an object of the present invention to simplify a mechanism that is capable of moving a support portion of a headrest for supporting a head of a sitting person when a vehicle back-side collision happens, thereby preventing the head from being inclined rearwardly.

Means for Solving the Problem

In order to solve the above-mentioned problem, a vehicle seat of the present invention uses a following means.

First, a first invention is a vehicle seat having a headrest moving mechanism that is capable of relatively moving a support portion of a headrest for supporting a head of a sitting person with respect to a seat back when a vehicle back-side collision is detected, so as to position the support portion closer to the head. The headrest moving mechanism includes a linking member that links the support portion of the headrest and a headrest base portion supported on the seat back to each other, and a guide pathway formed in the headrest base portion. The guide pathway is capable of slidably receiving the support portion in order to determine a postural position of the support portion of which the posture with respect to the headrest base portion can be rotationally displaced via the linking member. The guide pathway is shaped so as to move the support portion forwardly and upwardly with respect to the headrest base portion from an initial position in a time before the vehicle back-side collision happens to a collision preparatory position as the linking member is rotated.

According to the first invention, the support portion of the headrest for supporting the head of the sitting person slidably engages the guide pathway, so as to be normally retained in a posture of the initial position with respect to the headrest base portion. When the vehicle back-side collision is detected, as the linking member is rotated, the support portion moves forwardly and upwardly from the initial position to the collision preparatory position while sliding along the guide pathway.

Next, in a second invention related to the first invention, the headrest moving mechanism includes a stopper mechanism, so that in a condition in which the support portion reaches the collision preparatory position and in which an engagement portion provided to the support portion is restrained from moving in an advancing direction within the guide pathway, a loading caused by rearward inclination of the head and applied to the support portion can function as a pressing force that urges the engagement portion of the support portion to further move in the advancing direction.

According to the second invention, when the support portion reaches the collision preparatory position, the engagement portion provided to the support portion is restrained from sliding in the advancing direction with respect to the guide pathway. In this condition, when the loading caused by rearward inclination of the head is applied to the support portion, the loading urges the engagement portion to further slide in the advancing direction within the guide pathway. Therefore, the support portion cannot be pushed back even if the support portion is applied with the loading from the head, the support portion can catch the head in the collision preparatory position.

Next, in a third invention related to the first or second invention, the guide pathway formed in the headrest base portion is formed so as to have a concave shape depressed in a width direction of the headrest base portion. The engagement portion provided to the support portion is formed so as to have a convex shape that is capable of engaging the concaved guide pathway. A depressed stopper groove is formed in the guide pathway that guides the engagement portion from the initial position to the collision preparatory position. The stopper groove is capable of receiving the engagement portion when the engagement portion is pushed rearwardly within the guide pathway. The stopper groove is constructed to receive the engagement portion and to prevent the engagement portion from being pushed back rearwardly when the engagement portion is pressed by a loading from the head while the engagement portion is moving in the advancing direction.

According to the third invention, when the vehicle back-side collision is detected, if the support portion is applied with the loading from the head while the support portion is moving in the advancing direction toward the collision preparatory position, the engagement portion is applied with a corresponding force and is pushed back so as to enter the stopper groove. As a result, the support portion is in a position in which the support portion is restrained from further being pushed back. Therefore, the support portion can catch the head in this position.

Further, in a fourth invention related to the third invention described above, an engagement prevention mechanism is provided to the headrest base portion. When the engagement portion is moving in a retracting direction from the collision preparatory position toward the initial position, the engagement prevention mechanism is capable of prohibiting the engagement portion from entering the stopper groove formed in the guide pathway, thereby allowing the engagement portion to pass over the stopper groove. When the engagement portion moves within the guide pathway in the advancing direction from the initial position toward the collision preparatory position, the engagement prevention mechanism allows the engagement portion to enter the stopper groove on the way in an advancing movement thereof.

According to the fourth invention, if the support portion is applied with the loading from the head while the support portion moving toward the collision preparatory position, the engagement portion enters the stopper groove on the way in the advancing movement thereof. However, even if the support portion is applied with the loading from the head when the engagement portion is moving from the collision preparatory position toward the initial position, the engagement portion can be prohibiting from entering the stopper groove by the engagement prevention mechanism, so that the engagement portion can pass over the stopper groove.

Next, in a fifth invention related to the fourth invention described above, the engagement prevention mechanism comprises an arm-shaped prevention lever and a spring member biasing the prevention lever. The prevention lever is rotatably connected to the headrest base portion. The spring member maintains the prevention lever in a postural condition in which the prevention lever is exposed to the guide pathway. The prevention lever has a receiving portion that is formed in a forward end portion thereof and is capable of catching the engagement portion moving in the retracting direction. The prevention lever is capable of rotating and guiding the engagement portion caught by the receiving portion so as to move the same beyond the stopper groove. When the engagement portion moves in the advancing direction, the prevention lever allows the engagement portion to move in the advancing direction while pushed away by the engagement portion. When the engagement portion moves closer to the collision preparatory position, the prevention lever is disengaged from the engagement portion, so as to be returned to the postural condition in which the prevention lever is capable of catching the engagement portion moving in the retracting direction.

According to the fifth invention, the prevention lever is normally maintained by the spring member in the postural condition in which the prevention lever is exposed to the guide pathway. When the support portion moves in the advancing direction, the prevention lever allows the engagement portion to enter the stopper groove while pushed away by the engagement portion sliding in the advancing direction. However, when the support portion moves in the retracting direction from the collision preparatory position, the prevention lever is capable of catching the sliding engagement portion in the receiving portion thereof, thereby moving the engagement portion beyond the stopper groove while rotating.

Next, in a sixth invention related to any of the third to fifth inventions described above, a plurality of stopper grooves are formed in the guide pathway so as to be positioned thereal-ong.

According to the sixth invention, a plurality of stopper grooves are formed in the guide pathway so as to be positioned therealong. Therefore, when the support portion is applied with the loading from the head while the support portion is moving in the advancing direction, the engagement portion can enter one of the stopper grooves that is positioned closest thereto.

Next, in a seventh invention related to any of the first to fifth inventions described above, the guide pathway extends forwardly and upwardly with respect to the headrest base portion.

According to the seventh invention, the guide pathway extends forwardly and upwardly so as to correspond to a moving direction of the support portion. Therefore, the support portion can move while substantially maintaining an inclined posture thereof with respect to the headrest base portion.

Effect of the Invention

The means described above may provide following effects.

According to the first invention, due to simple construction in which the support portion is linked to the headrest base portion and slidably engages the guide pathways, the support portion can move from the initial position to the collision preparatory position that can prevent the rearward inclination of the head while maintaining an inclined posture of the support portion with respect to the headrest base portion.

Further, according to the second invention, the stopper mechanism is provided for preventing the support portion from being pushed back even if the support portion is applied with a loading from the head when the support portion reaches the collision preparatory position, and the stopper mechanism is constructed of an engagement structure in which the support portion and the headrest base portion are slidably engaged with each other. Therefore, construction for preventing the rearward inclination of the head can be simplified and streamlined.

Further, according to the third invention, the stopper groove that is capable of preventing the support portion from being pushed back by the head is formed in the guide pathway along which the support portion slides. Therefore, even when the support portion is moving in an advancing direction, the head can be prevented from being inclined rearwardly. As a result, such construction can be simplified.

Further, according to the fourth invention, an engagement prevention mechanism is provided. When the support portion is moving in the advancing direction, the engagement prevention mechanism allows the stopper portion to engage the stopper groove on the way in an advancing movement thereof. Conversely, when the support portion is moving in a retracting direction from the collision preparatory position, the engagement prevention mechanism is capable of guiding the support portion such that the support portion can pass over the stopper groove. Therefore, the support portion can be smoothly returned to the initial position.

Further, according to the fifth invention, the engagement prevention mechanism is constructed of an arm-shaped prevention lever and a spring member retaining the prevention lever in an initial position. Therefore, the engagement prevention mechanism can be constructed of relatively simple components.

Further, according to the sixth invention, a plurality of stopper grooves are formed in the guide pathway so as to be positioned therealong. Therefore, when the support portion is moving in the advancing direction, the support portion can be prevented from being pushed back by the head in a plurality positions on the way in the advancing movement thereof.

Further, according to the seventh invention, the guide pathway extends forwardly and upwardly so as to correspond to a moving direction of the support portion. Therefore, the support portion can move while substantially maintaining an

Figure 1:
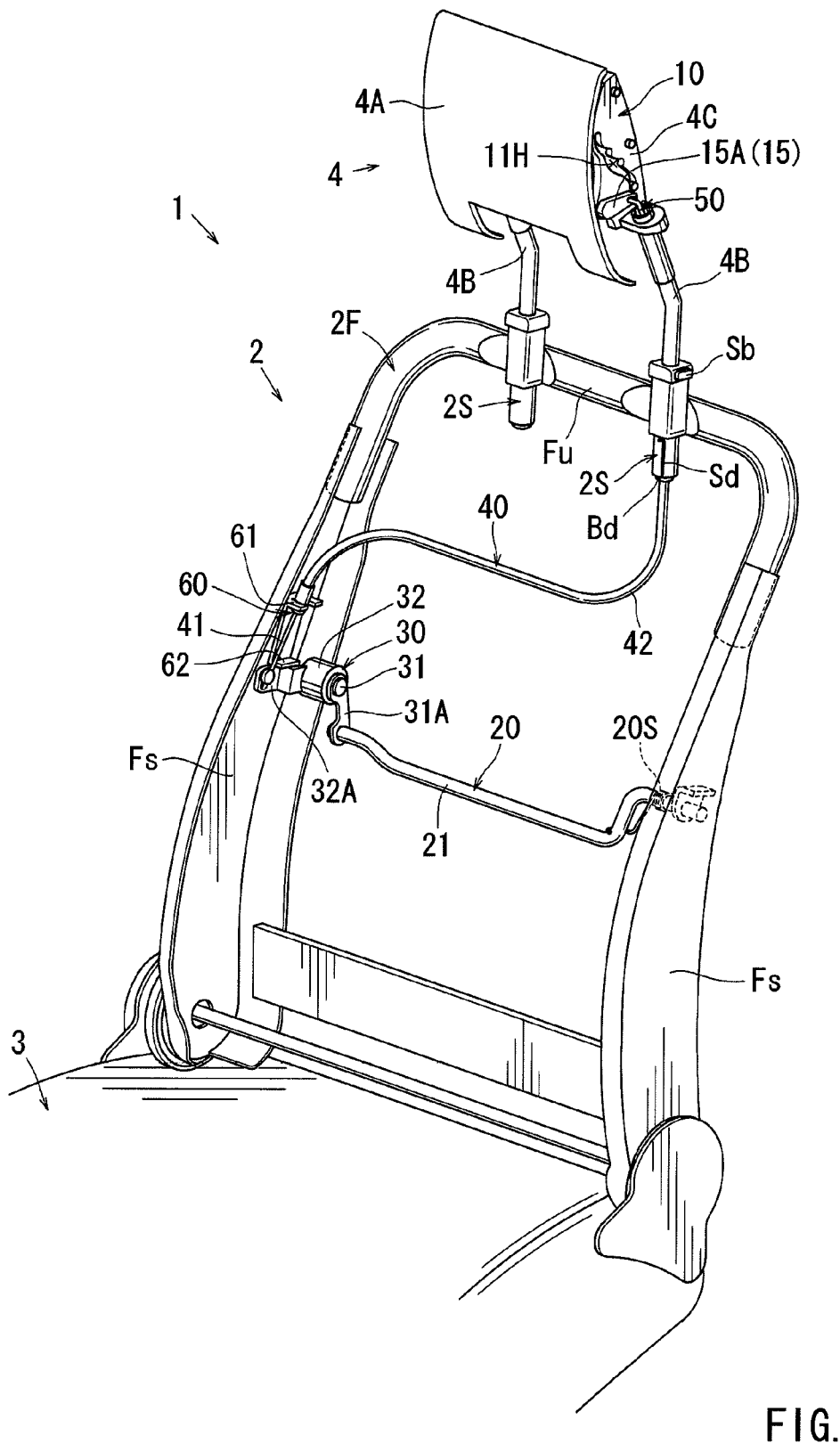
FIG. 1 is a perspective view of a vehicle seat according to Embodiment 1, which schematically illustrates construction thereof.

DESCRIPTION OF SYMBOLS 1 vehicle seat
2 seat back
2F back frame
Fu upper frame
Fs side frame
2S support
Sb knob
St engagement claw
Sd insertion groove
3 seat cushion
4 headrest
4A support portion
4B stay
Bk engagement groove
Bd reception groove
4C headrest base portion
10 headrest moving mechanism
11B rear surface portion
11D bottom surface portion
11S side surface portion
11U top surface portion
11R rib
11H elongated hole (guide pathway)
H0 lower end portion
H1 first stopper groove (stopper groove)
H2 second stopper groove (stopper groove)
H3 upper end portion
12 linking member
12A connection shaft
12B connection shaft
13 support member
13A connection shaft (engagement portion)
14 hook
14A connection shaft
14B upper jaw portion
14C lower jaw portion
14D engagement groove
14S torsion spring
15 engagement-disengagement member
15A operation arm portion
15B connection shaft
15C engagement arm portion
15S torsion spring
16 tension spring
17 prevention lever
17A connection shaft
17B receiving portion
17S torsion spring (spring member)
20 pressure receiving member
20S torsion spring
21 pressure receiving portion
30 damper
31 rotation shaft
31A connection arm
32 case
32A operation arm
40 operation cable
41 inner member
41P engagement projection
42 outer member
42S elongated hole
42H head portion
42D bulged portion
50 push rod
60 attachment bracket
61 outer attaching portion
62 stopper

BEST MODE FOR CARRYING OUT THE INVENTION

In the following, the best mode for carrying out the present invention is described with reference to the drawings.

Embodiment 1

First, construction of a vehicle seat according to Embodiment 1 is described with reference to FIGS. 1 to 14.

FIG. 1 is a perspective view of the vehicle seat 1, which schematically illustrates construction thereof. The vehicle seat 1 is composed of a seat back 2 that functions as a back support of a sitting person, a seat cushion 3 that functions as a seating portion, and a headrest 4 that functions as a head support. In the drawings such as FIG. 1, in order to clarify inner structure of the seat back 2, the headrest 4 and other components, covering structure thereof is omitted.

The headrest 4 has two rod-shaped stays 4B and 4B that are vertically attached to a lower portion thereof. The stays 4B and 4B are respectively inserted into insertion ports Sa formed in cylindrical supports 2S and 2S that are attached to an upper surface portion of the seat back 2, so that the headrest 4 is attached to the upper surface portion of the seat back 2. The supports 2S and 2S are integrally secured to an upper frame Fu of a back frame 2F that constitutes a framework of the seat back 2. The upper frame Fu is integrally connected to both of side frames Fs and Fs, so as to connect upper end portions of the side frames Fs and Fs.

The headrest 4 is normally retained in its predetermined position, so as to catch the head of the sitting person at a rear side position thereof. However, the headrest 4 is constructed such that when a vehicle back-side collision happens, a support portion 4A can instantaneously move forwardly, so as to move closer to the head. The support portion 4A is positioned at a front side of the headrest 4 and is constructed to catch the head. That is, the headrest 4 is constructed such that when the vehicle back-side collision, only the support portion 4A of the headrest 4 can move to a position immediately behind the back of the head of the sitting person that has a posture in which the body is forwardly spaced from the seat back 2 and the headrest 4. Thus, when the vehicle back-side collision happens, rearward inclination of the head can be quickly prevented by the support portion 4A. As a result, a loading applied to the neck can be reduced, so that a whiplash injury can be prevented.

Figure 5:
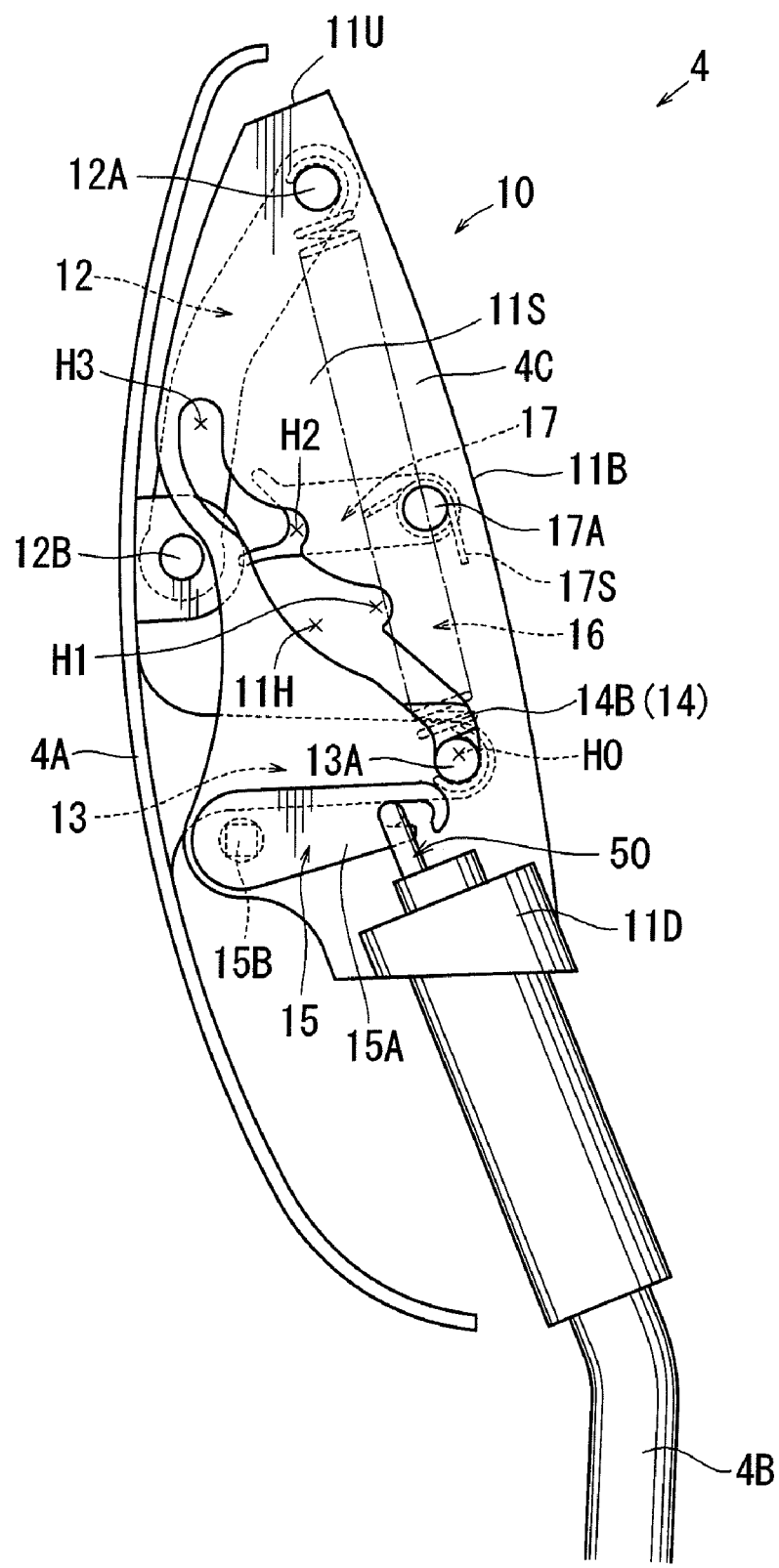
FIG. 5 is a side view, which illustrates a condition in which a support portion of the headrest is retained in an initial position.

Motion to move the support portion 4A forwardly when the vehicle back-side collision happens can be performed by a headrest moving mechanism 10 that is incorporated into the headrest 4. As shown in FIG. 5, in a normal condition in which the vehicle back-side collision does not yet happen, the headrest moving mechanism 10 retains the support portion 4A in a posture of an initial position thereof while maintaining the support portion 4A in a forward movement restraint condition. Further, the support portion 4A is normally biased in a forward moving direction, i.e., in a direction toward the head, by a tension spring 16 that is positioned between the support portion 4A and a headrest base portion 4C integrated with the stays 4B and 4B. Therefore, in the normal condition in which the vehicle back-side collision does not yet happen, the support portion 4A is retained in the initial position against a biasing force of the tension spring 16.

Figure 8:
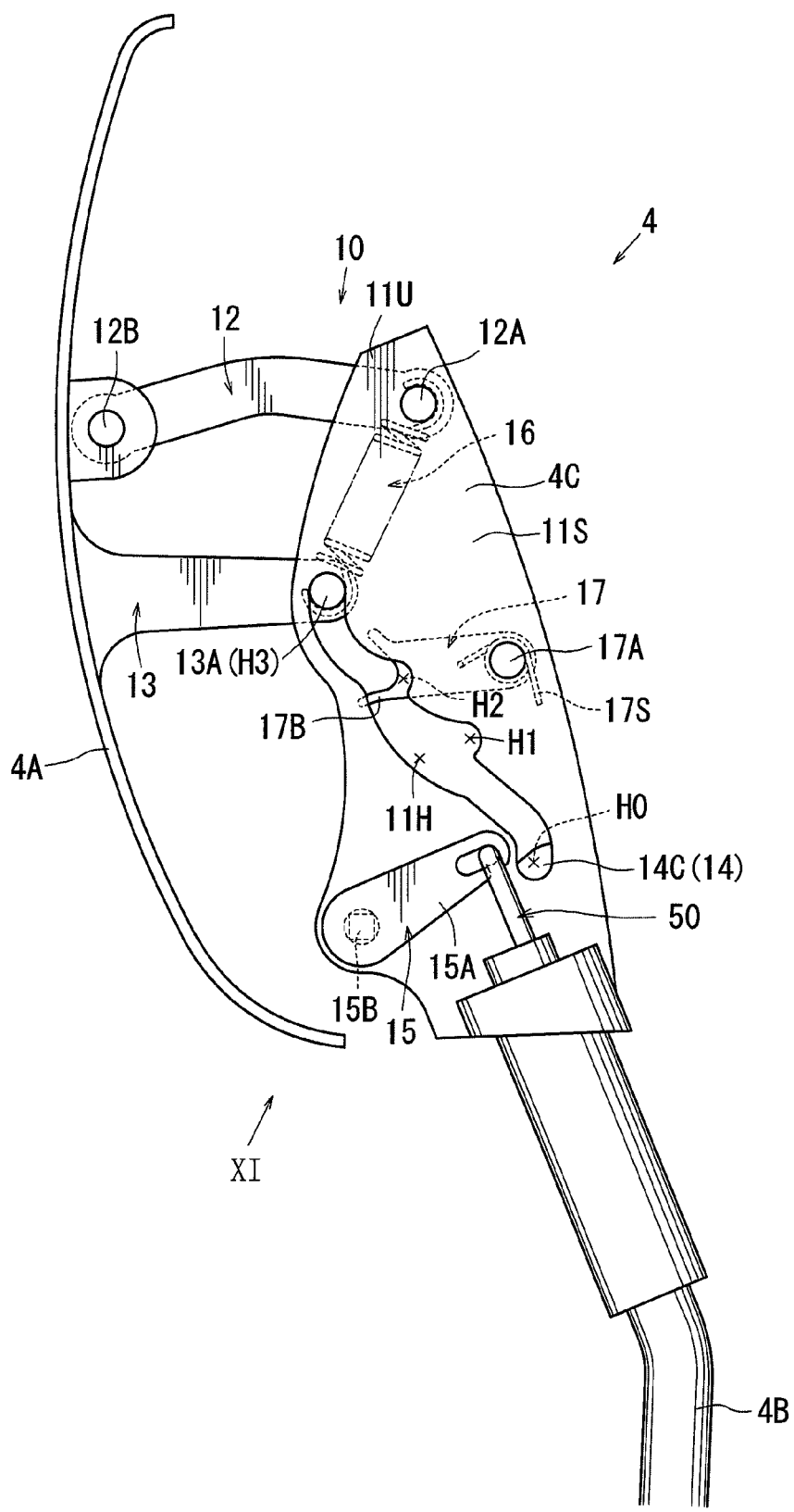
FIG. 8 is a side view, which illustrates a condition in which the support portion of the headrest reaches a collision preparatory position.

When the vehicle back-side collision happens and the movement restraint condition of the support portion 4A is canceled, the headrest moving mechanism 10 can move the support portion 4A forwardly by the biasing force of the tension spring 16. At this time, the headrest moving mechanism 10 can move the support portion 4A forwardly and upwardly along profiles of elongated holes 11H and 11H formed in the headrest base portion 4C which will be described hereinafter. As a result, as shown in FIG. 8, the support portion 4A is moved to the position immediately behind the back of the head (a collision preparatory position). The headrest moving mechanism 10 is constructed such that in the condition in which the support portion 4A is moved to the collision preparatory position, the support portion 4A cannot be pushed back even if the support portion 4A is applied with a loading caused by the rearward inclination of the head when the vehicle back-side collision happens. As a result, the head of the sitting person can be stably caught by the support portion 4A in the collision preparatory position.

Further, the elongated holes 11H and 11H correspond to guide pathways in the present invention.

Referring to FIG. 1 again, an operation of canceling the movement restraint condition of the support portion 4A in the initial position as described above can be performed by a push up motion of a push rod 50. The push rod 50 is inserted into the right side tubular stay 4B of the headrest 4, as seen in the drawing.

Figure 2:
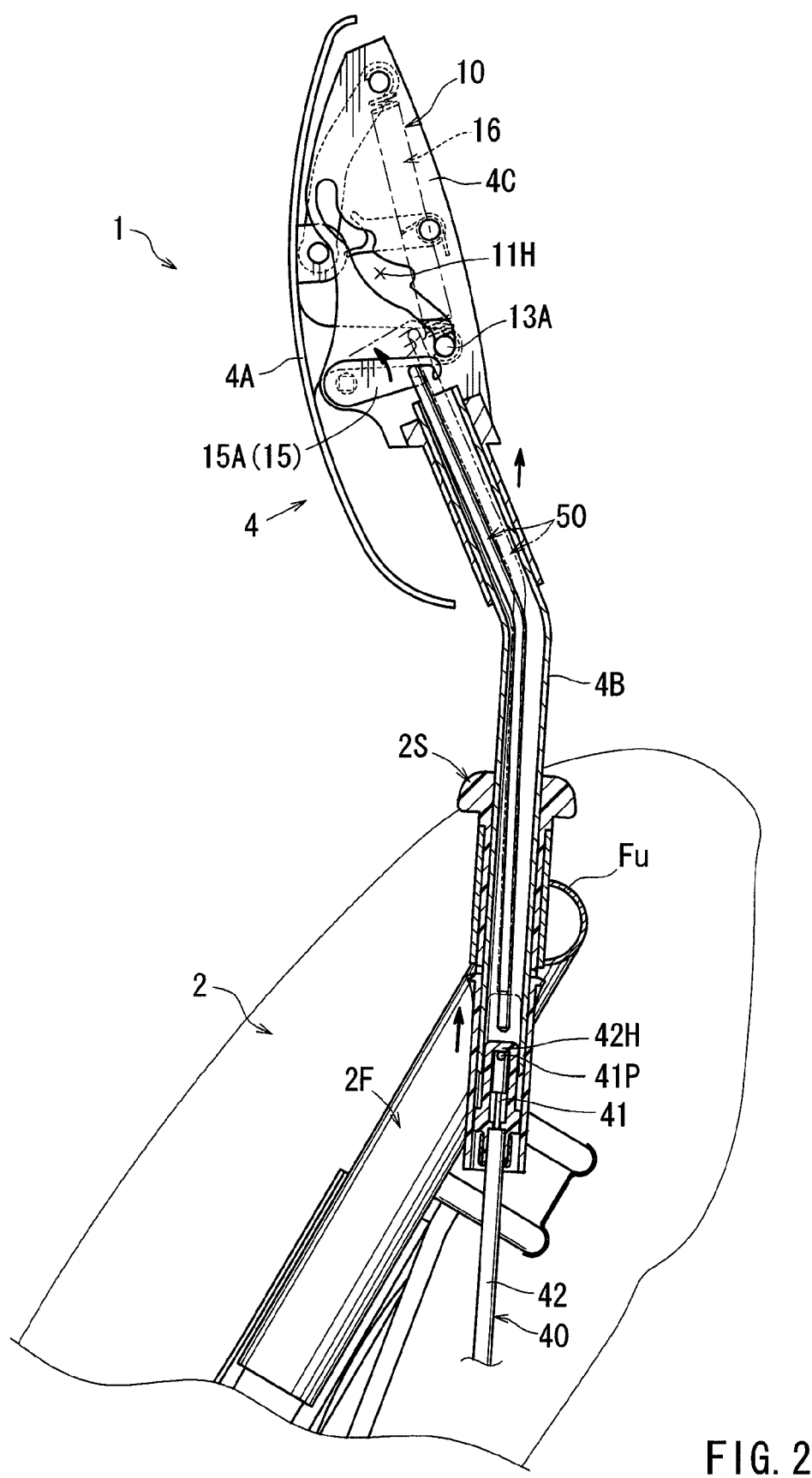
FIG. 2 is a structural diagram, which illustrates a structure in which a push rod is pushed upwardly by an operation cable.

As shown in FIG. 2, an upper end portion of the push rod 50 is connected to an engagement-disengagement member 15 that is provided as an operation member of the headrest moving mechanism 10. Further, a lower end portion of the push rod 50 is connected to an upper end portion of an operation cable 40 that is disposed inside the seat back 2.

Figure 4:
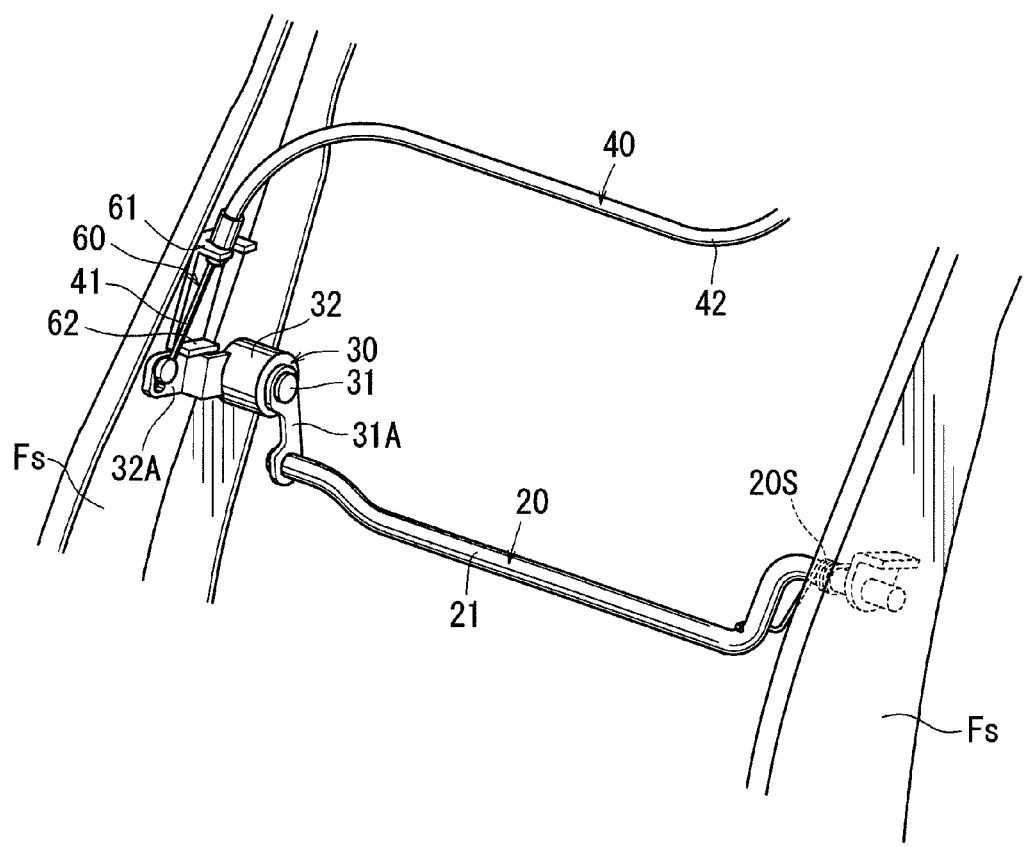
FIG. 4 is an enlarged perspective view of a detection device that can detect a vehicle back-side collision.

As shown in FIG. 4, a lower end portion of the operation cable 40 is connected to a pressure receiving member 20 that is disposed in the seat back 2, so that the operation cable 40 can be pulled downwardly when the vehicle back-side collision happens. The pressure receiving member 20 may function as a detection device of the vehicle back-side collision. Further, as shown in FIG. 2, the operation cable 40 is constructed such that when its lower end portion is pulled, a corresponding operational force is transmitted to its upper end portion in reverse, thereby pushing up the push rod 50.

Further, when the push rod 50 is pushed up, the engagement-disengagement member 15 is pushed and rotated counterclockwise as seen in the drawing, so that the movement restraint condition of the support portion 4A can be canceled.

In the following, construction of the above-mentioned detection device of the vehicle back-side collision, i.e., the detection device for pushing up the push rod 50 when the vehicle back-side collision happens, is described.

As shown in FIG. 4, the bent rod-shaped pressure receiving member 20 is disposed in the seat back 2 so as to be positioned in a middle portion thereof. The pressure receiving member 20 is positioned so as to extend in a width direction. A right end portion of the pressure receiving member 20 as seen in the drawing is rotatably supported on a right side frame Fs of the seat back 2. Further, a left end portion of the pressure receiving member 20 as seen in the drawing is rotatably supported on a left side frame Fs via a rotary type damper 30.

Formed in a widthwise middle portion of the pressure receiving member 20 is a pressure receiving portion 21 that capable of receiving a seat back loading applied by the sitting person. The pressure receiving portion 21 is formed by bending the right end portion of the pressure receiving member 20 downwardly as seen in the drawing, so as to be offset from a rotation center thereof. Thus, when the pressure receiving portion 21 is pressed rearwardly by the seat back loading applied by the sitting person, the pressure receiving member 20 can be rotated about the both end portions thereof.

Further, a torsion spring 20S is disposed between the right end portion of the pressure receiving member 20 and the side frame Fs. The torsion spring 20S is disposed while it is previously twisted, thereby rotationally biasing the pressure receiving member 20 in such a direction as to push the pressure receiving portion 21 forwardly. As a result, the pressure receiving member 20 is normally maintained in a postural condition in which the pressure receiving portion 21 is pressed against a cushion pad (not shown) that is attached to a seat back surface of the seat back 2.

Further, a well-known rotary type damper is used as the damper 30 that is connected to the left end portion of the pressure receiving member 20. That is, in the damper 30, a rotation shaft 31 is inserted into a cylindrical case 32. The rotation shaft 31 and the case 32 are assembled so as to be rotated relative to each other.

The rotation shaft 31 has a connection arm 31A that is attached to a right end portion thereof as seen in the drawing. The connection arm 31A is integrally connected to the left end portion of the pressure receiving member 20. Further, a left end portion of the rotation shaft 31 as seen in the drawing is rotatably supported by the left side frame Fs. Thus, the case 32 is supported by the rotation shaft 31, so as to be rotatable with respect to the side frame Fs. Further, the case 32 has an operation arm 32A that is attached to an outer circumferential surface thereof. The operation arm 32A is connected to a lower end portion of an inner member 41 of the operation cable 40 which will be described hereinafter. The case 32 is constructed such that when the operation arm 32A contacts a stopper 62 of an attachment bracket 60 that is attached to the side frame Fs, its movement in such a direction as to contact the stopper 62 can be restrained.

The case 32 described above is filled with a viscous fluid such as silicone oil and is hermetically sealed. As a result, when the rotation shaft 31 is urged to rotate relative to the case 32, a viscous resistance is produced therebetween dependent upon a rotating speed thereof. This viscous resistance is applied between the rotation shaft 31 and the case 32. The viscous resistance is increased as the rotating speed of the rotation shaft 31 is increased. Conversely, the viscous resistance is decreased as the rotating speed of the rotation shaft 31 is decreased. When the applied viscous resistance is large, a rotational force of the rotation shaft 31 can be easily transmitted to the case 32. Conversely, when the applied viscous resistance is small, the rotational force of the rotation shaft 31 cannot be not easily transmitted to the case 32.

When the sitting person reclines against the seat back 2, the pressure receiving member 20 and the damper 30 thus constructed may operate as follows.

First, in the normal condition in which the vehicle backside collision does not yet happen, when the sitting person reclines against the seat back 2, the pressure receiving member 20 is pushed and rotated rearwardly at a relatively gentle speed corresponding to behavior of the sitting person. Therefore, in this case, the rotation shaft 31 can rotate relative to the case 32 at a relatively gentle speed, so that the applied viscous resistance is small. As a result, the rotation shaft 31 idles within the case 32, so that the rotational force of the rotation shaft 31 can not be transmitted to the case 32.

However, when the vehicle back-side collision happens, the sitting person is sharply pressed against the seat back 2 by impact of the collision. At this time, the pressure receiving member 20 is pushed and rotated rearwardly at a relatively high speed corresponding to impulsive motion of the setting person. Therefore, in this case, the rotation shaft 31 can relatively rotate at a relatively high speed, so that the applied viscous resistance is large. As a result, the rotational force of the rotation shaft 31 can be transmitted to the case 32, so that the case 32 can rotate integrally with the rotation shaft 31. Thus, the case 32 can pull the lower end portion of the inner member 41 of the operation cable 40 downwardly because the lower end portion of the inner member 41 is connected to the operation arm 32A.

Further, when the lower end portion of the inner member 41 of the operation cable 40 is pulled, as shown in FIG. 2, the corresponding operational force is transmitted to an upper end portion of the inner member 41, so that the push rod 50 is pushed up within the support 2S.

Next, a transmission mechanism of the operational force transmitted from the operation cable 40 to the push rod 50 is described.

Figure 3:
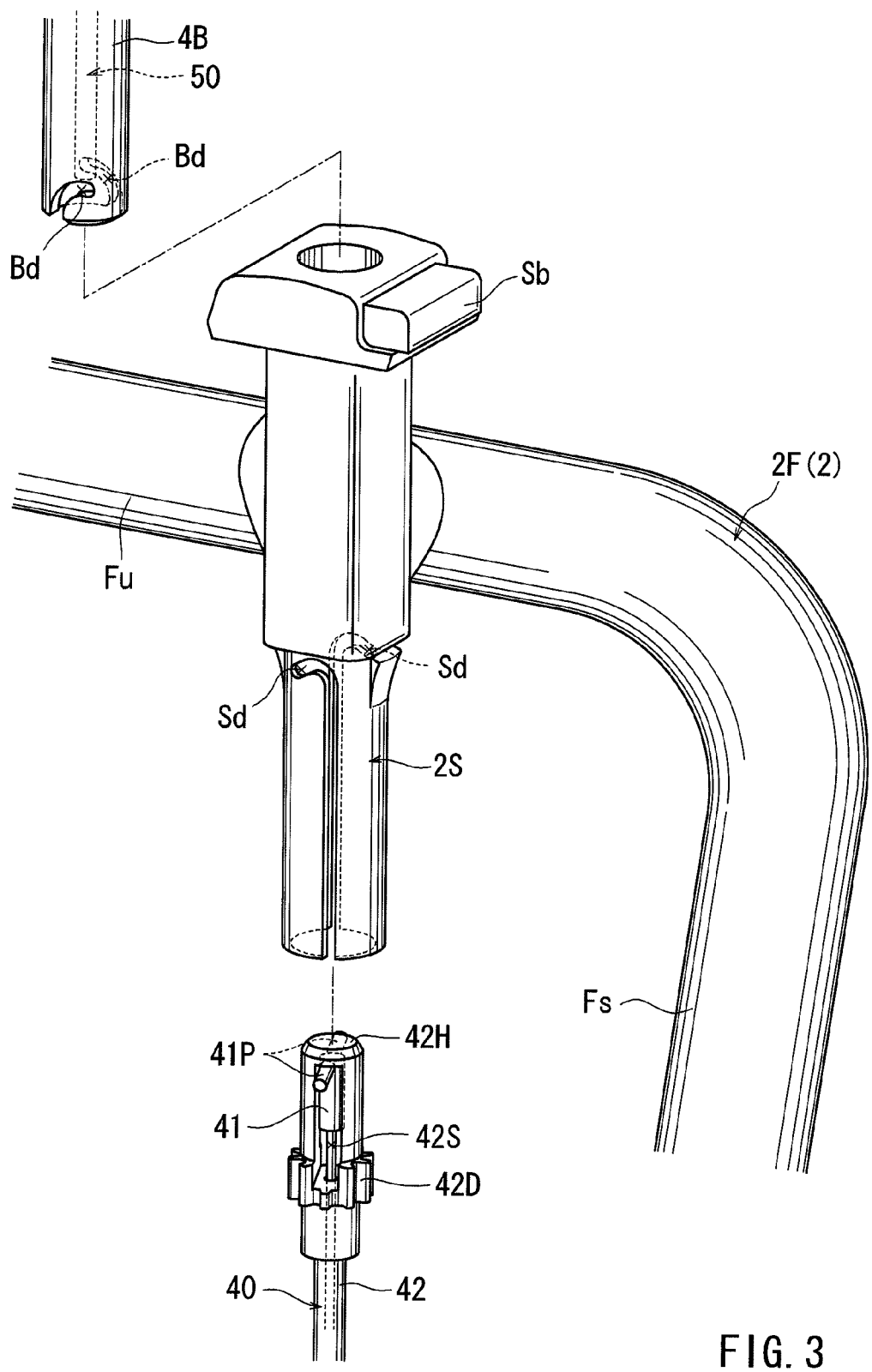
FIG. 3 is an enlarged perspective view, which illustrates an insertion structure in which a stay of a headrest and the operation cable are inserted into a cylindrical support.

The operation cable 40 has a double layer structure in which the linear inner member 41 is inserted into a flexible tubular outer member 42. The inner member 41 has flexibility greater than the outer member 42. As shown in FIG. 3, the operation cable 40 is disposed inside the seat back 2, and the lower end portion of the inner member 41 is connected to the operation arm 32A of the damper 30 as described above. Further, a lower end portion of the outer member 42 is connected to an outer attaching portion 61 of the attachment bracket 60 that is attached to the left side frame Fs as seen in the drawing. Thus, the operation cable 40 is constructed such that the lower end portion of the inner member 41 is pulled from the lower end portion of the outer member 42 when the vehicle back-side collision happens.

As shown in FIGS. 2 and 3, upon insertion of the upper end potion of the operation cable 40 into the support 2S from below, the operation cable 40 can be assembled to the support 2S so as to push the push rod 50 disposed in the cylindrical stay 4B that is inserted into the cylindrical support 2S.

In particular, as shown in FIG. 3, the operation cable 40 is constructed such that T-shaped engagement projections 41P and 41P formed in the upper end portion of the inner member 41 are projected radially outwardly from elongated through holes 42S and 42S that are formed in a circumferential wall of the upper end of the outer member 42.

As a result, the inner member 41 can axially move relative to the outer member 42 within a range corresponding to a range that the T-shaped engagement projections 41P and 41P can move within the elongated holes 42S and 42S. The engagement projections 41P and 41P and the elongated holes 42S and 42S are axisymmetrically formed in two circumferential positions of the inner member 41 and the outer member 42. A head portion 42H is formed in an upper end portion of the outer member 42, so as to close a tubular end portion thereof.

Figure 12:
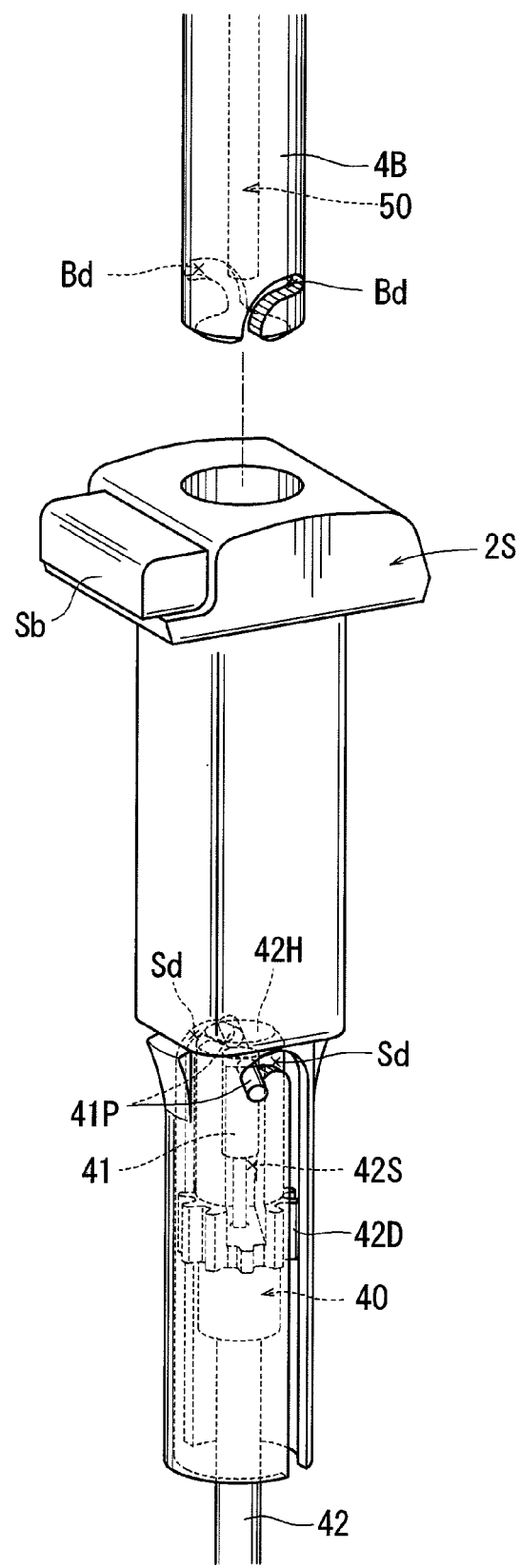
FIG. 12 is a perspective view, which illustrates a condition before the stay is inserted into the cylindrical support.
Figure 13:
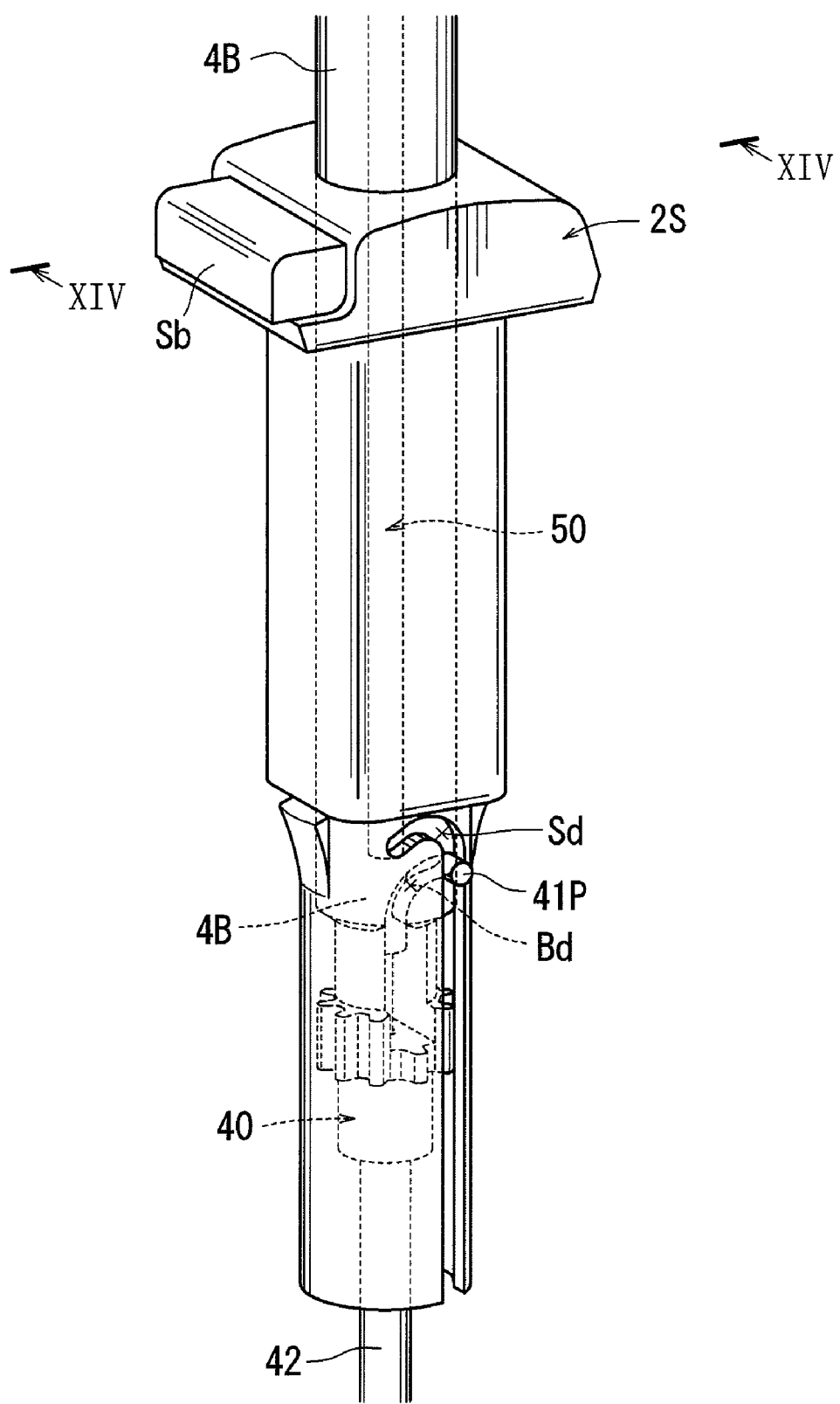
FIG. 13 is a perspective view, which illustrates a condition in which the stay is inserted into the cylindrical support.

As shown in FIG. 12, when the upper end portion of the operation cable 40 thus constructed is inserted into the cylindrical the support 2S from below, the operation cable 40 is temporarily retained while the upper end portion thereof is suspended from the support 2S. In this suspended condition, as shown in FIG. 13, upon insertion of the stay 4B into the cylindrical support 2S from above, the operation cable 40 can be transferred from a condition in which the operation cable 40 is suspended from the support 2S to a condition in which the operation cable 40 is suspended from the stay 4B.

Further, when the operation cable 40 is in the condition in which it is suspended from the stay 4B, the operation cable 40 is in a condition in which the operation cable 40 can transmit the operational force produced from the lower end thereof being pulled to the push rod 50 positioned inside the stay 4B in reverse as a pushing operational force.

The construction described above is described in detail with reference to FIG. 3. First, formed in a circumferential wall of the support 2S are slot-shaped insertion grooves Sd and Sd that extend axially upwardly from a lower end portion of the support 2S. The insertion grooves Sd and Sd are positioned in two circumferential positions of the support 2S so as to be axisymmetrical with each other. The insertion grooves Sd and Sd are respectively shaped such that the engagement projections 41P and 41P formed in the inner member 41 of the operation cable 40 can be received therein and can be inserted thereinto in an axial direction.

The insertion grooves Sd and Sd are respectively shaped such that terminal end portions corresponding to upper end sides thereof that receive the engagement projections 41P and 41P are respectively circumferentially curved leftwardly and rightwardly as seen in the drawings. In particular, the insertion groove Sd positioned in a near side in FIG. 3 and shown by solid lines is shaped such that the terminal end portion thereof is gently curved leftwardly as seen in the drawing. Conversely, the insertion groove Sd positioned in a far side in FIG. 3 and shown by broken lines is shaped such that the terminal end portion thereof is curved rightwardly as seen in the drawing. That is, the insertion groove Sd positioned in the far side in FIG. 3 is shaped so as to be axisymmetrical with the insertion groove Sd positioned in the near side in FIG. 3.

Each of the circumferentially curved terminal end portions of the insertion grooves Sd and Sd is shaped so as to be positioned below a horizontal level line. As a result, when the engagement projections 41P and 41P (the operation cable 40) are inserted into the insertion grooves Sd and Sd until they reach terminal end positions thereof, the engagement projections 41P and 41P are stably retained while suspended from the support 2S, so as to be prevented from falling therefrom under their own weight.

The operation cable 40 can be inserted into the cylindrical support 2S by simply inserting the same upwardly (axially) after the engagement projections 41P and 41P attached to the upper end portion of the inner member 41 are inserted into the insertion grooves Sd and Sd. Further, when the engagement projections 41P and 41P reach the axial terminal end positions of the insertion grooves Sd and Sd, the operation cable 40 is circumferentially rotated along to the curved terminal end portions. Thus, as shown in FIG. 12, the engagement projections 41P and 41P reach the circumferentially curved terminal end positions of the insertion grooves Sd and Sd, so that the operation cable 40 can be retained while suspended from the support 2S.

Referring to FIG. 3 again, the upper end portion of the outer member 42 is integrally formed from a synthetic resin, so as to have a bulged portion 42D that is partially bulged radially outwardly. The bulged portion 42D is positioned at an axial mid point of the upper end portion of the outer member 42 that is inserted into the cylindrical support 2S. The bulged portion 42D is formed over the entire circumference thereof and has a serration shape. The bulged portion 42D is formed to have an outer diameter substantially equal to an inner diameter of the cylindrical support 2S. Therefore, because the bulged portion 42D can be gently fitted into the cylindrical support 2S when the upper end portion of the operation cable 40 is inserted into the cylindrical support 2S, the operation cable 40 can be smoothly inserted without swinging within the cylindrical support 2S.

Further, as shown in FIG. 12, slot-shaped reception grooves Bd and Bd are formed in a circumferential wall of the stay 4B that is inserted into the cylindrical support 2S from above. The reception grooves Bd and Bd are formed so as to extend axially upwardly from an lower end portion of the stay 4B. The reception grooves Bd and Bd are positioned in two circumferential positions of the stay 4B so as to be axisymmetrical with each other. When the stay 4B is inserted into the cylindrical support 2S from above, the reception grooves Bd and Bd may receive the engagement projections 41P and 41P of the inner member 41 of the operation cable 40 that is suspended in the cylindrical support 2S. Further, when the stay 4B is further inserted into the support 2S after the engagement projections 41P and 41P are received in the reception grooves Bd and Bd, the engagement projections 41P and 41P are introduced upwardly (axially) along the reception grooves Bd and Bd.

The reception grooves Bd and Bd that receive the engagement projections 41P and 41P are respectively shaped such that terminal end portions corresponding to upper end sides thereof are circumferentially curved in opposite directions to the insertion grooves Sd and Sd formed in the support 2S described above. Each of the curved terminal end portions of the reception grooves Bd and Bd is shaped so as to be gently curved from an axial direction to a horizontal direction. As a result, when the stay 4B is inserted into the cylindrical support 2S, the engagement projections 41P and 41P positioned in the cylindrical support 2S can be smoothly received in the reception grooves Bd and Bd by a push-in operational force axially applied to the stay 4B until they reach the terminal end positions of the reception grooves Bd and Bd that are directed horizontally.

Therefore, as shown in FIG. 13, when the stay 4B is inserted into the cylindrical support 2S from above, the engagement projections 41P and 41P are circumferentially rotated while guided by the curved portion of the reception grooves Bd and Bd formed in the stay 4B. As a result, the engagement projections 41P and 41P are pushed back from a condition in which the engagement projections 41P and 41P are retained in the terminal end positions of the insertion grooves Sd and Sd and are moved in such a direction as to be released from this condition. When the engagement projections 41P and 41P move along the curved portions of the reception grooves Bd and Bd and reach the terminal end positions thereof, the engagement projections 41P and 41P are pushed back to axially extended portions of the insertion grooves Sd and Sd.

Thus, the engagement projections 41P and 41P are transferred from the condition in which they are suspended from the support 2S such that axial movement thereof is restrained to the condition in which they are suspended from the stay 4B. As a result, the engagement projections 41P and 41P are placed in a condition in which their axial movement with respect to the stay 4B is restrained. That is, the engagement projections 41P and 41P are released from the axial movement restraint condition in which their axial movement with respect to the support 2S is restrained, so as to be placed in the condition in which their axial movement with respect to the stay 4B is restrained.

At this time, because the engagement projections 41P and 41P are positioned in the axially extended portions of the insertion grooves Sd and Sd, the engagement projections 41P and 41P are placed in a condition in which their circumferential movement with respect to the support 2S is restrained. As a result, the engagement projections 41P and 41P are retained in the terminal end positions of the reception grooves Bd and Bd while guided by the axially extended insertion grooves Sd and Sd. Thus, the inner member 41 of the operation cable 40 and the stay 4B are axially integrally connected to each other, so as to be placed in a condition in which they can axially move together with each other with respect to the support 2S.

Figure 14:
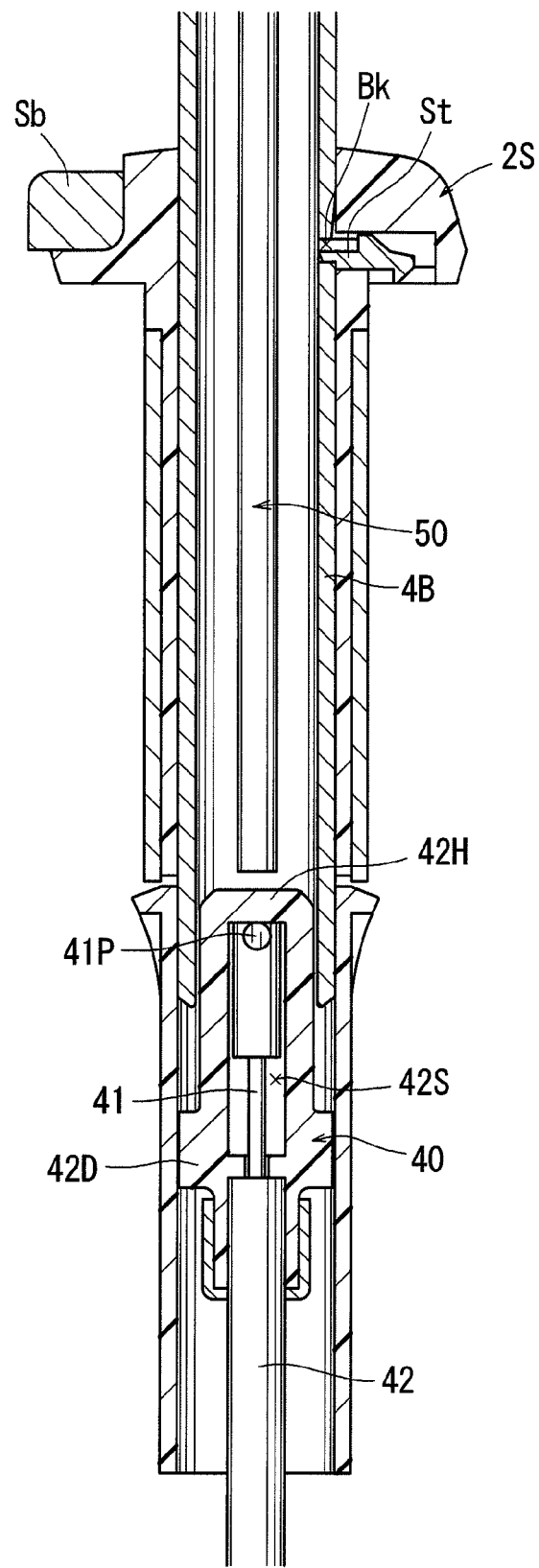
FIG. 14 is a sectional view taken along line XIV-XIV of FIG. 13.

As shown in FIG. 14, disposed in the cylindrical support 2S is a plate-shaped engagement claw St that is capable of engaging recess-shaped engagement grooves Bk that are formed in the outer circumferential wall of the stay 4B. The engagement claw St is normally applied with a biasing force and is maintained in a postural condition in which the engagement claw St is projected into the cylindrical support 2S. The engagement claw St can be retracted from the cylindrical support 2S by pushing a knob Sb from the side.

Thus, when a insertion position of one of the engagement grooves Bk is aligned with the engagement claw St upon insertion of the stay 4B into the cylindrical support 2S, the engagement claw St enters and engages the corresponding engagement groove Bk by the biasing force. As a result, the stay 4B is placed in a condition in which the stay 4B is restrained from moving in an inserting direction, so as to be locked The condition in which the stay 4B is restrained from moving in the inserting direction can be canceled by disengaging the engagement claw St from the engagement groove Bk by pushing the knob Sb. The engagement grooves Bk are formed in a plurality of positions in the axial direction of the stay 4B. Therefore, height of the headrest 4 can be freely adjusted by appropriately performing pushing operation of the knob Sb.

As described above, upon insertion of the stay 4B, the lower end portion of the stay 4B and the upper end portion of the inner member 41 are axially connected to each other, thereby providing a condition in which the head portion 42H of the outer member 42 of the operation cable 40 is inserted into the cylindrical stay 4B from below. As a result, the head portion 42H of the outer member 42 is axially positioned closer to the lower end portion of the push rod 50 that is inserted in the cylindrical stay 4B.

Strictly speaking, a small gap is formed between the lower end portion of the push rod 50 and the head portion 42H such that the push rod 50 cannot be erroneously pushed by the head portion 42H of the outer member 42 when the stay 4B is inserted.

Further, in a condition in which the head portion 42H of the outer member 42 and the lower end portion of the push rod 50 are axially positioned closer to each other, the head portion 42H and the push rod 50 is in an axial connection condition in which the operational force produced from the lower end of the operation cable 40 being pulled can be reversed by the head portion 42H of the outer member 42 and be transmitted to the push rod 50 as the pushing operational force.

Further, the above-described headrest 4 can be detached from the seat back 2 by pulling the stays 4B and 4B from the cylindrical the supports 2S and 2S. At this time, as the stays 4B and 4B are drawn out, an axial connection condition of the inner member 41 and the lower end portion of the stay 4B as described above is canceled.

In particular, as will be recognized from FIG. 13, as the stay 4B is upwardly pulled from the support 2S, the engagement projections 41P and 41P are circumferentially rotated while guided by the curved portion of the insertion grooves Sd and Sd of the support 2S. As a result, the engagement projections 41P and 41P are pushed back from a condition in which the engagement projections 41P and 41P are retained in the terminal end positions of the reception grooves Bd and Bd and are moved in such a direction as to be removed from this condition. When the engagement projections 41P and 41P move along the curved portions of the insertion grooves Sd and Sd and reach the terminal end positions thereof, the engagement projections 41P and 41P are pushed back to axially extended portions of the reception grooves Bd and Bd. As a result, as shown in FIG. 12, the engagement projections 41P and 41P are transferred again from the condition in which they are suspended from the stay 4B to the condition in which they are suspended from the support 2S. Thus, the axial connection condition of the head portion 42H of the outer member 42 of the operation cable 40 and the push rod 50 in which they are positioned closer to each other can be canceled.

Next, the headrest moving mechanism 10 is described. While construction of the headrest moving mechanism 10 is shown in FIGS. 5 to 11, the construction is best shown in FIG. 8. Therefore, the construction is described with reference to this drawing.

The headrest moving mechanism 10 is arranged such that the support portion 4A is connected to the headrest base portion 4C. The headrest moving mechanism includes a pair of linking members 12 and 12 that are laterally positioned, support members 13 and 13, hooks 14 and 14, an engagement-disengagement member 15, the tension spring 16 and prevention levers 17 and 17.

The headrest base portion 4C is made of a synthetic resin. The headrest base portion 4C has a plate-shaped rear surface portion 11B, a bottom surface portion 11D, side surface portions 11S and 11S and a top surface portion 11U that are integrally formed. In particular, the bottom surface portion 11D extends forwardly from a lower end edge of the rear surface portion 11B. Further, the side surface portions 11S and 11S are vertically positioned on widthwise both sides of the headrest base portion 4C. Further, the top surface portion 11U connects upper edges of the side surface portions 11S and 11S.

Figure 11:
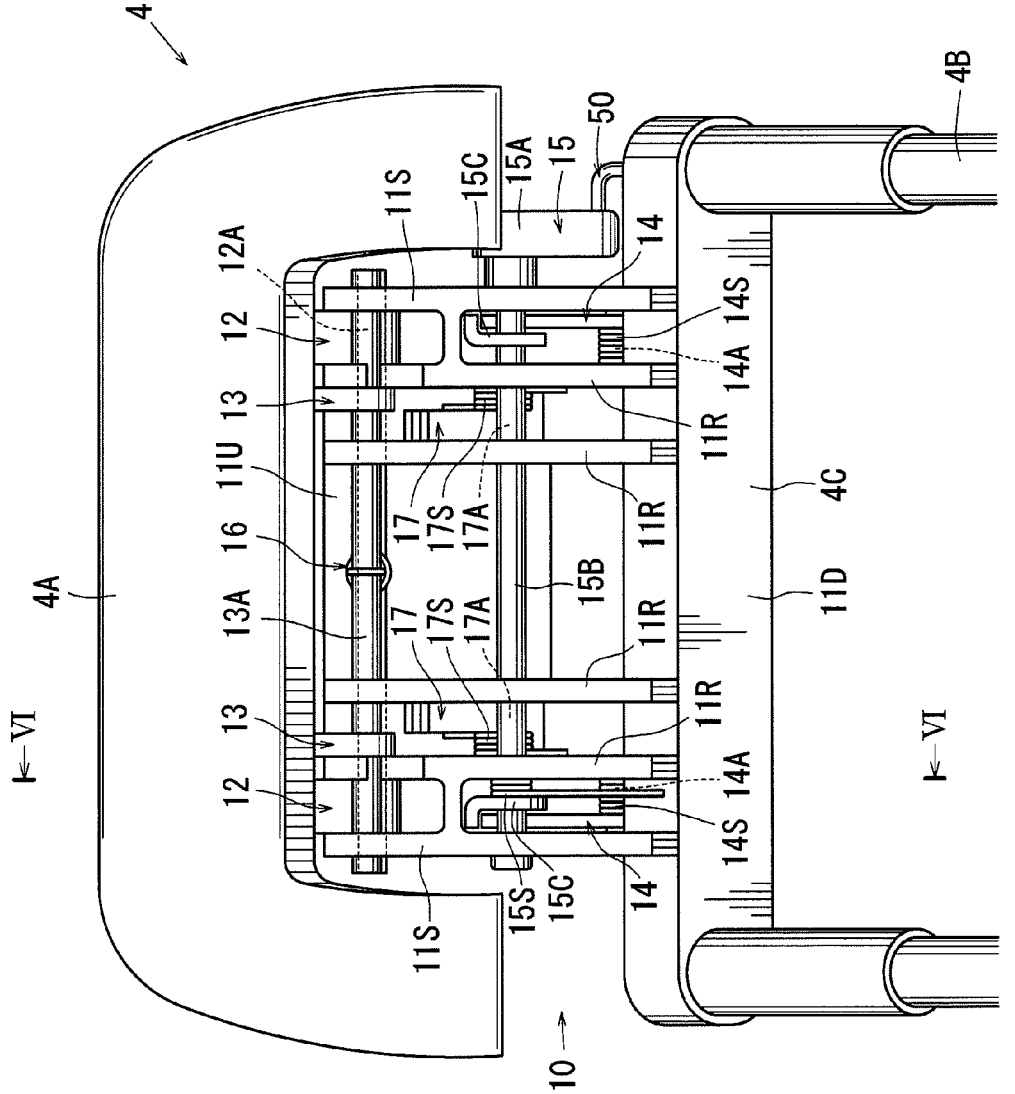
FIG. 11 is a structural diagram of the headrest moving mechanism, which is viewed from line XI of FIG. 8.

FIG. 11 is a view that is viewed from line XI of FIG. 8, that is, a front view of the headrest 4 that is viewed from obliquely below. As shown in the drawing, a plurality of upright plate-shaped ribs 11R—(A symbol "—" means a plural number.) are formed between the side surface portions 11S and 11S of the headrest base portion 4C, so as to reinforce the headrest base portion 4C. The ribs 11R—are vertically positioned in parallel.

Upper end portions of the stays 4B and 4B are respectively inserted into the bottom surface portion 11D of the headrest base portion 4C, and are integrally fixed thereto. Further, the stays 4B and 4B have tubular shapes and are secured to the bottom surface portion 11D such that opened upper end portions thereof are exposed to an upper surface side of the bottom surface portion 11D.

Further, wave-shaped elongated holes 11H are formed in the side surface portions 11S and 11S of the headrest base portion 4C. The elongated holes 11H and 11H are formed by cutting out the side surface portions 11S and 11S in a thickness direction thereof. The elongated holes 11H and 11H have first stopper grooves H1 and second stopper grooves H2 that are formed between lower end portions H0 and H0 and upper end portions H3 and H3. The first stopper grooves H1 and the second stopper grooves H2 are depressed rearwardly (rightwardly in the drawings) in a wave-like and step-like fashion. Further, each of the first stopper grooves H1 and the second stopper grooves H2 correspond to a stopper groove of the present invention.

Next, referring to FIG. 8 again, a pair of linking members 12 and 12 are made of a synthetic resin. The linking members 12 and 12 may function as connection members that link the headrest base portion 4C and the support portion 4A to each other. The linking members 12 and 12 are positioned on the support portion 4A so as to be laterally spaced from each other, and their end portions are respectively connected to an upper end portion of the headrest base portion 4C and a rear surface of the support portion 4A.

In particular, the rear end portions of the linking members 12 and 12 are rotatably supported by a connection shaft 12A that passes through the side surface portions 11S and 11S of the headrest base portion 4C. Further, as shown in FIG. 11, the rear end portions of the linking members 12 and 12 are positioned between the side surface portions 11S and 11S and the ribs 11R and 11R positioned inside thereof. Thus, the linking members 12 and 12 are rotatably supported by the connection shaft 12A that extends between the side surface portions 11S and 11.

Referring to FIG. 8 again, the front end portions of the linking members 12 and 12 are rotatably supported by a connection shaft 12B that is laterally positioned on the rear surface of the support portion 4A. The connection shafts 12A and 12B are positioned so as to be parallel to each other.

The above-described linking members 12 and 12 are arranged, when rotated clockwise about the connection shaft 12A that rotatably supports the rear end portions thereof, to contact the top surface portion 11U of the headrest base portion 4C, so that their clockwise rotation can be restrained.

Next, a pair of support members 13 and 13 are integrally connected to the support portion 4A so as to extend rearwardly from the rear surface of the support portion 4A in arm-like fashion. The support members 13 and 13 are positioned on the support portion 4A so as to be laterally spaced from each other. The support portion 4A is made of a synthetic resin. Further, the support portion 4A is integrally formed such that a front surface thereof has a curved plate-shape. Further, the rear surface of the support portion 4A is integrally formed with support portions for rotatably supporting the connection shaft 12B. Also, the rear surface of the support portion 4A is integrally formed with the support members 13 and 13.

Rear end portions of the support members 13 and 13 are connected to each other by a connection shaft 13A that extends in a width direction. In particular, as shown in FIG. 11, the rear end portions of the support members 13 and 13 are positioned between the ribs 11R and 11R positioned outside thereof and the ribs 11R, 11R positioned inside thereof. Further, the connection shaft 13A that connects the rear end portions of the support members 13 and 13 is positioned so as to be parallel to the connection shaft 12A and the connection shaft 12B described above. Further, the connection shaft 13A corresponds to an engagement portion of the present invention.

End portions of the connection shaft 13A are passed through the elongated holes 11H and 11H that are formed in the side surface portions 11S and 11S of the headrest portion 4C. Therefore, the connection shaft 13A is capable of moving back and forth and up and down within a range defined by the profiles of elongated holes 11H and 11H. Further, the ribs 11R—(FIG. 11) that are formed between the side surface portions 11S and 11S are shaped so as to not interfere with the connection shaft 13A that moves within the elongated holes 11H and 11H.

Figure 6:
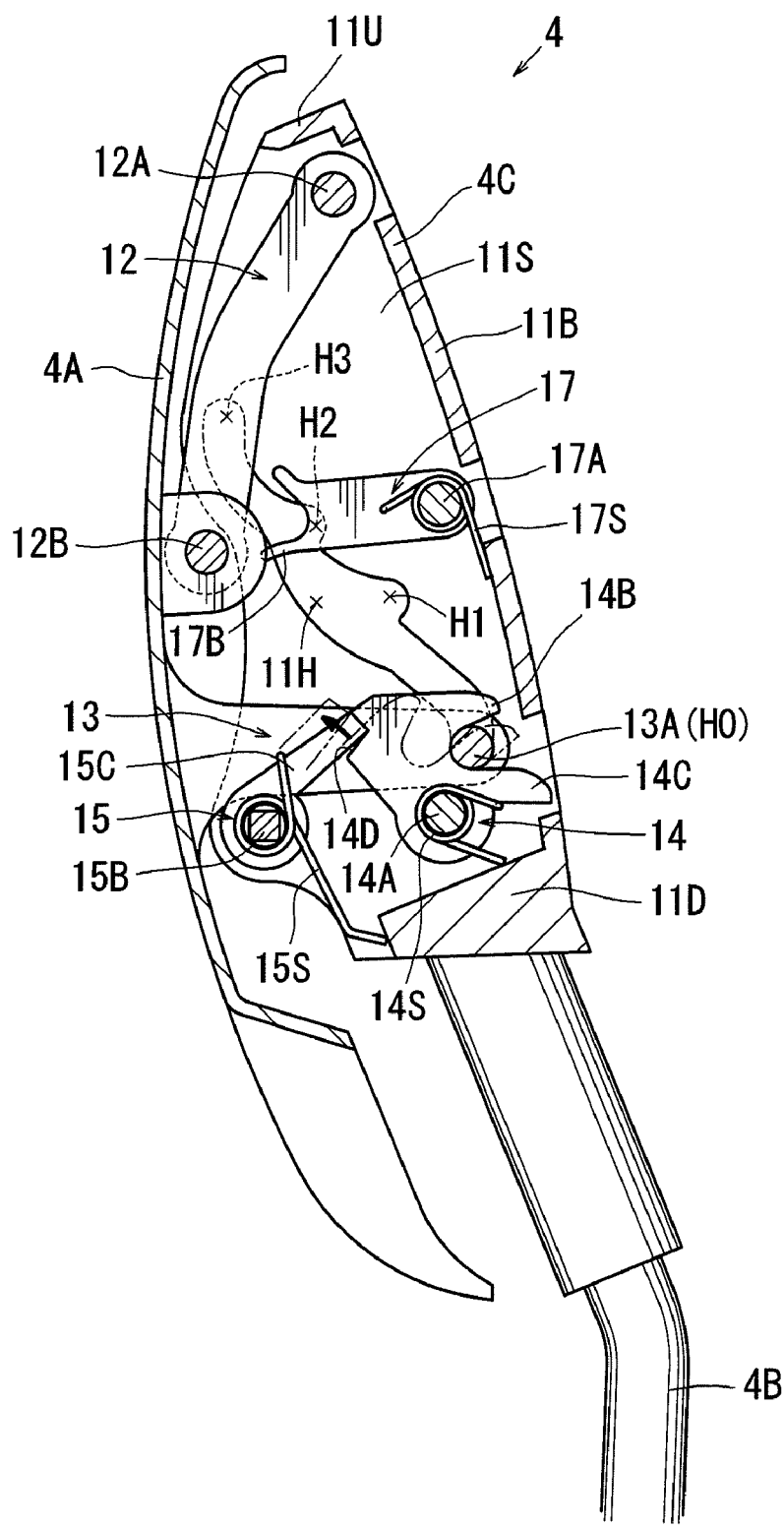
FIG. 6 is a schematic view of internal structure of a headrest moving mechanism, which corresponds to a sectional view taken along line VI-VI of FIG. 11.

Next, as shown in FIG. 6, a pair of hooks 14 and 14 are formed to cam shapes as a whole and are disposed in the headrest base portion 4C. The hooks 14 and 14 are positioned at a lower end portion of the headrest base portion 4C so as to be laterally spaced from each other. The hooks 14 and 14 are provided as retainer members for retaining the connection shaft 13A that is capable of moving within the elongated holes 11H and 11H at the lower end portions H0 and H0 which define an initial position of the connection shaft 13A.

In particular, as shown in FIG. 11, the hooks 14 and 14 are positioned between the side surface portions 11S and 11S and the ribs 11R and 11R positioned inside thereof and are respectively rotatably supported by connection shafts 14A and 14A that extend therebetween.

Referring to FIG. 6 again, formed in each of the hooks 14 and 14 is a claw-shaped upper jaw portion 14B and a claw-shaped lower jaw portion 14C that extend radially outwardly thereof. Each of the upper jaw portion 14B and the lower jaw portion 14C is positioned in two positions on outer circumferential portions of the hook 14. Formed between the upper jaw portions 14B and the lower jaw portions 14C are recesses that are shaped such that the above-mentioned connection shaft 13A can be receive therein. The connection shafts 14A and 14A are positioned so as to be parallel to the connection shafts 12A and 12B and the connection shaft 13A.

Further, torsion springs 14S and 14S are disposed between the hooks 14 and 14 and the headrest base portion 4C described above. The torsion springs 14S and 14S are disposed while they are previously twisted. The hooks 14 and 14 are biased by the torsion springs 14S and 14S so as to be rotated counterclockwise from a position shown in FIG. 6.

Further, step-shaped engagement grooves 14D are formed in the outer circumferential portions of the hooks 14 and 14. The engagement grooves 14D and 14D engage a pair of engagement arm portions 15C and 15C that are formed in the engagement-disengagement member 15 which will be described hereinafter. Thus, the hooks 14 and 14 can be maintained in a condition in which counterclockwise rotation thereof by biasing forces is restrained.

Therefore, in the condition in which the counterclockwise rotation of the hooks 14 and 14 is restrained, the hooks 14 and 14 can maintain the connection shaft 13A in a condition in which the connection shaft 13A is retained in the lower end portions H0 and H0 of the elongated holes 11H and 11H, which portions define the initial position of the connection shaft 13A, while the connection shaft 13A is received in the recesses formed between the upper jaw portions 14B and 14B and the lower jaw portions 14C and 14C.

As shown in FIG. 5, the connection shaft 13A is normally biased toward the connection shaft 12A by the tension spring 16 that is disposed between the connection shaft 13A and the connection shaft 12A, so as to be biased toward the upper end portions H3 and H3 along the profiles of the elongated holes 11H and 11H. Thus, the connection shaft 13A is normally maintained in an initial condition in which the connection shaft 13A is retained in the lower end portions H0 and H0 of the elongated holes 11H and 11H by the hooks 14 and 14 against the biasing force of the tension spring 16.

Figure 7:
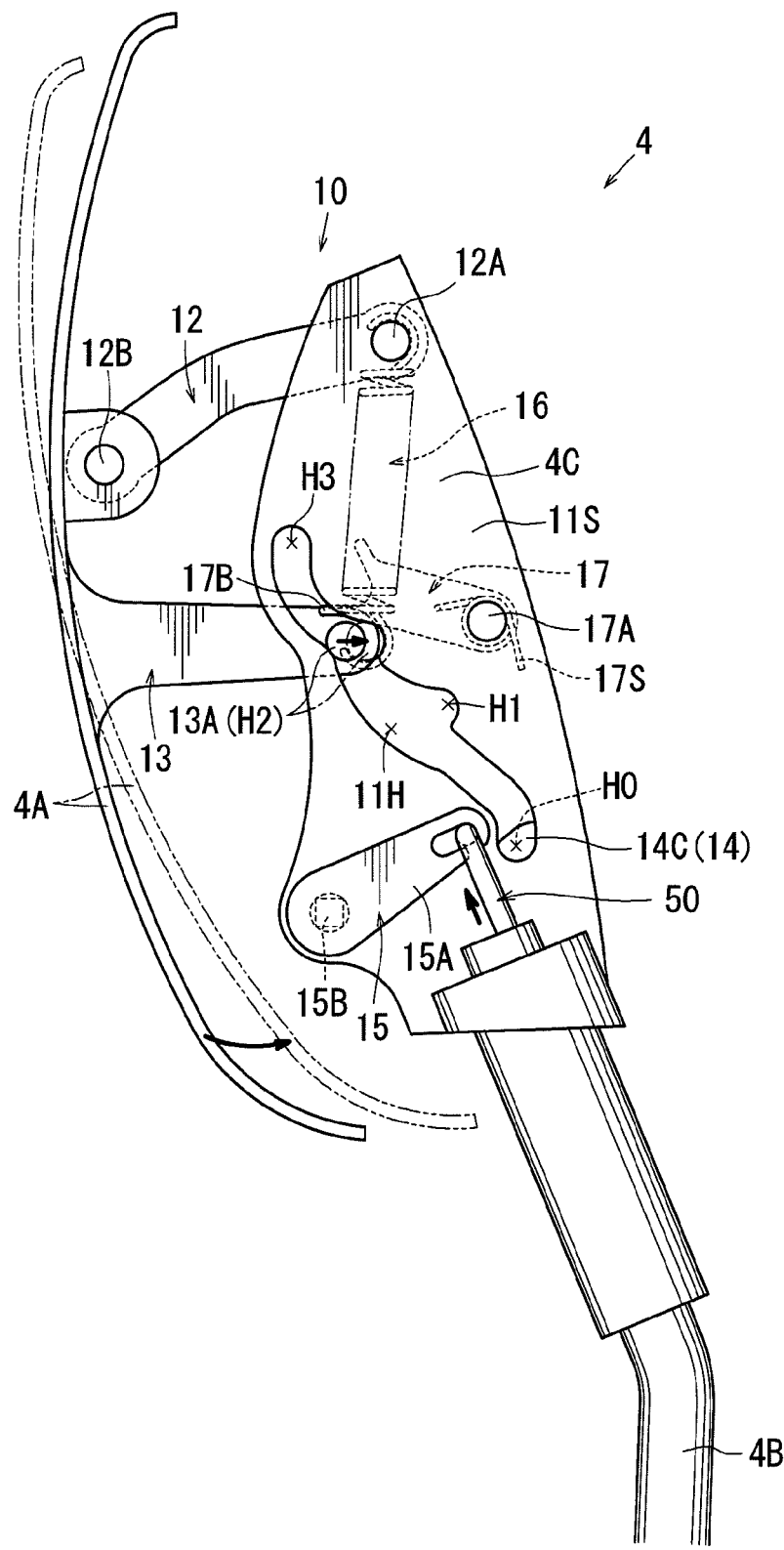
FIG. 7 is a side view, which illustrates a condition in which the support portion of the headrest is moving toward a head.

Further, referring to FIG. 6 again, when the engagement arm portions 15C and 15C are disengaged from the hooks 14 and 14 upon counterclockwise rotation thereof, the hooks 14 and 14 can rotate counterclockwise by biasing forces of the torsion springs 14S and 14S. As a result, as indicated by broken lines in FIG. 6, the upper jaw portions 14B and 14B of the hooks 14 and 14 are moved out of the elongate holes 11H and 11H, and the lower jaw portions 14C and 14C are pushed up from below, so as to be exposed to the elongated holes 11H and 11H. Thus, the condition in which the connection shaft 13A is retained by the hooks 14 and 14 is canceled. As a result, as shown in FIGS. 7 and 8, the connection shaft 13A moves forwardly and upwardly along the profiles of the elongated holes 11H and 11H by the biasing force of the tension spring 16. As a result, the support portion 4A relatively moves forwardly and upwardly with respect to the headrest base portion 4C while rotating the linking members 12 and 12.

Referring to FIG. 6 again, the engagement arm portions 15C and 15C that can restrain the counterclockwise rotation of the hooks 14 and 14 are positioned so as to be laterally spaced from each other, and are positioned so as to be capable of engaging the hooks 14 and 14. In particular, as shown in FIG. 11, similar to the hooks 14 and 14, the engagement arm portions 15C and 15C are positioned between the side surface portions 11S and 11S and the ribs 11R and 11R positioned inside thereof. Further, the engagement arm portions 15C and 15C are rotatably supported by a connection shaft 15B that extends between the side surface portions 11S and 11S. The connection shaft 15B is integrally connected to the engagement arm portions 15C and 15C and is rotatably supported by the side surface portions 11S and 11S. The connection shaft 15B is positioned so as to be parallel to the connection shafts 12A and 12B and the connection shaft 13A.

Further, a torsion spring 15S is dispose between one of the engagement arm portions 15C and the headrest base portion 4C. The torsion spring 15S is disposed while it is previously twisted. As shown in FIG. 6, the torsion spring 15S biases the engagement arm portions 15C and 15C clockwise. Thus, the engagement arm portions 15C and 15C are normally maintained in a condition in which they are pressed to the outer circumferential portions of the hooks 14 and 14 while distal ends of the engagement arm portions 15C and 15C respectively engage the step-shaped engagement grooves 14D and 14D. When the engagement arm portions 15C and 15C engage the engagement grooves 14D and 14D, the engagement arm portions 15C and 15C and the engagement grooves 14D and 14D are oppositely contact each other, so that biased rotation thereof are mutually restrained.

Further, referring to FIG. 5 again, an operation arm portion 15A is integrally connected to an end portion of the connection shaft 15B that is connected to the engagement arm portions 15C and 15C described above. The operation arm portion 15A is arranged so as to be rotated by the push rod 50 described above. When the vehicle back-side collision happens and the push rod 50 is pushed upwardly, the operation arm portion 15A is rotated counterclockwise. As a result, as shown in FIG. 6, the operation arm portion 15A rotates the engagement arm portions 15C and 15C in the same direction, thereby disengaging the engagement arm portions 15C and 15C from the hooks 14 and 14. Thus, a condition in which the support portion 4A is retained in the initial position can be canceled, so that the support portion 4A is transferred forwardly and upwardly by the biasing force of the tension spring 16.

As shown in FIG. 8, forward and upward movement of the support portion 4A is restrained and stopped when the connection shaft 13A reaches the upper end portions H3 and H3 of the elongated holes 11H and 11H. Further, in a condition in which an advancing movement of the support portion 4A is stopped, the support portion 4A cannot be pushed back rearwardly even if the support portion 4A is applied with a loading from the head of the sitting person.

That is, when the connection shaft 13A reaches the upper end portions H3 and H3 of the elongated holes 11H and 11H, the linking members 12 and 12 connected to the supported portion 4A contact the top surface portion 11U of the headrest base portion 4C, so as to become a condition in which clockwise rotation thereof is restrained. In the condition in which the clockwise rotation of the linking members 12 and 12 is restrained, when the support portion 4A is applied with a force that urges the same to move rearwardly caused by the rearward inclination of the head, the linking members 12 and 12 are applied with a force that urges the same to press against the top surface portion 11U of the headrest base portion 4C. The force thus produced may function as a force that further presses the connection shaft 13A in an advancing direction (upwardly) from the upper end portions H3 and H3 of the elongated holes 11H and 11H. Therefore, even if the support portion 4A is applied with a pressing force as described above, the support portion 4A is prevented from being rotated counterclockwise. As a result, the support portion 4A can catch the head of the sitting person in the collision preparatory position.

Further, as shown in FIG. 7, the support portion 4A can be prevented from being pushed back rearwardly if it is pressed by the head of the sitting person while it is moving forwardly. That is, when the connection shaft 13A is applied with a force that urges the same to move rearwardly while the support portion 4A is moving forwardly, the connection shaft 13A can enter the first stopper grooves H1 and H1 or the second stopper grooves H2 and H2 that are formed in the elongated holes 11A and 11A so as to be depressed rearwardly (rightwardly in the drawings) in the step-like fashion. As a result, rearward movement of the connection shaft 13A is restrained, so that the support portion 4A can be maintained in positions on the way of forward movement thereof. Therefore, even when the support portion 4A does not yet reach the collision preparatory position, the head of the sitting person can be caught by the support portion 4A. Further, FIG. 7 shows a condition in which the connection shaft 13A is placed in the second stopper grooves H2 and H2.

Referring to FIG. 5 again, attached to the headrest base portion 4C are a pair of prevention levers 17 and 17. The prevention levers 17 and 17 are positioned so as to be laterally spaced from each other, and their rear end portions are respectively rotatably connected to the headrest base portion 4C.

In particular, as shown in FIG. 11, the rear end portions of the prevention levers 17 and 17 are positioned between the outer ribs 11R and 11R and the inner ribs 11R and 11R and are respectively rotatably supported by connection shafts 17A and 17A that extend therebetween.

Further, torsion springs 17S and 17S are disposed between the prevention levers 17 and 17 and the headrest base portion 4C. Further, the torsion springs 17S and 17S correspond to spring members of the present invention. As shown in FIG. 5, the torsion springs 17S and 17S are wound around the connection shafts 17A and 17A. One end of each of the torsion springs 17S and 17S is connected to each of the prevention levers 17 and 17. The other end of each of the torsion springs 17S and 17S is connected to the headrest base portion 4C. Thus, in their free conditions, the prevention levers 17 and 17 are maintained in a postural condition in which they are exposed to the elongated holes 11H and 11H by spring forces of the torsion springs 17S and 17S.

Spoon-shaped receiving portions 17B are respectively formed in left or forward end portions of the prevention levers 17 and 17 that are exposed to the elongated holes 11H and 11H. As shown in FIG. 7, when the connection shaft 13A moves upwardly in the advancing direction from the lower ends H0 and H0 within the elongated holes 11H and 11H, the receiving portions 17B and 17B are pushed away by the connection shaft 13A, so as to be pushed out of the elongated holes 11H and 11H. However, as shown in FIG. 8, when the connection shaft 13A reaches the upper end portions H3 and H3 of the elongated holes 11H and 11H, the receiving portions 17B and 17B are returned to the postural condition in which they are exposed to the elongated holes 11H and 11H by the spring forces of the torsion springs 17S and 17S.

Figure 9:
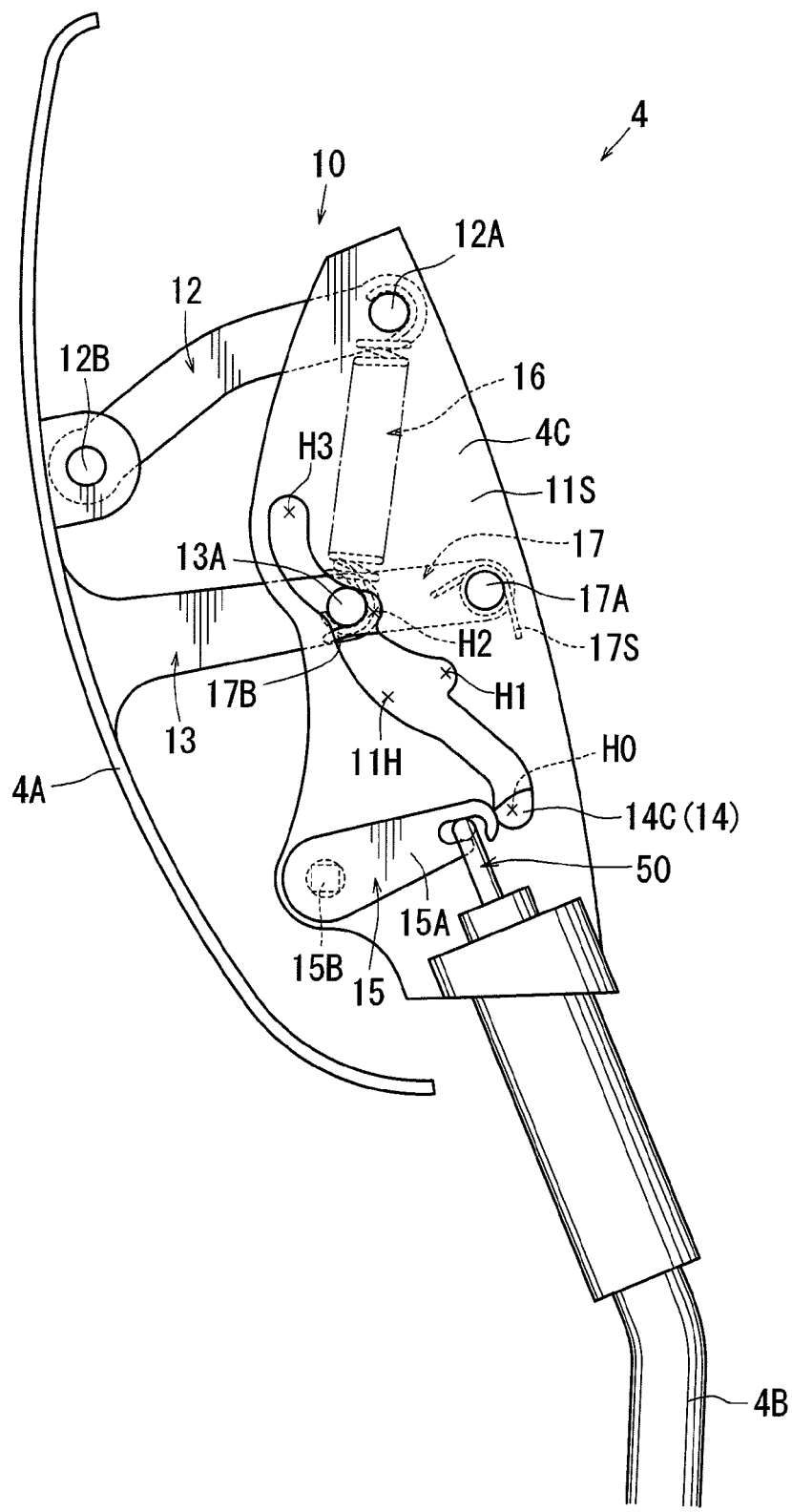
FIG. 9 is a side view, which illustrates a condition in which the support portion of the headrest is moving from the collision preparatory position toward the initial position.

Further, as shown in FIG. 9, when the connection shaft 13A is transferred within the elongated holes 11H and 11H downwardly in a retracting direction from the upper end portions H3 and H3, the receiving portions 17B and 17B catch the connection shaft 13A by their spoon-shaped distal ends. Further, when, in this condition, the connection shaft 13A is further transferred downwardly, the prevention levers 17 and 17 are pushed and rotated counterclockwise in the drawing while pressed by the connection shaft 13A that is caught by the receiving portions 17B and 17B.

Figure 10:
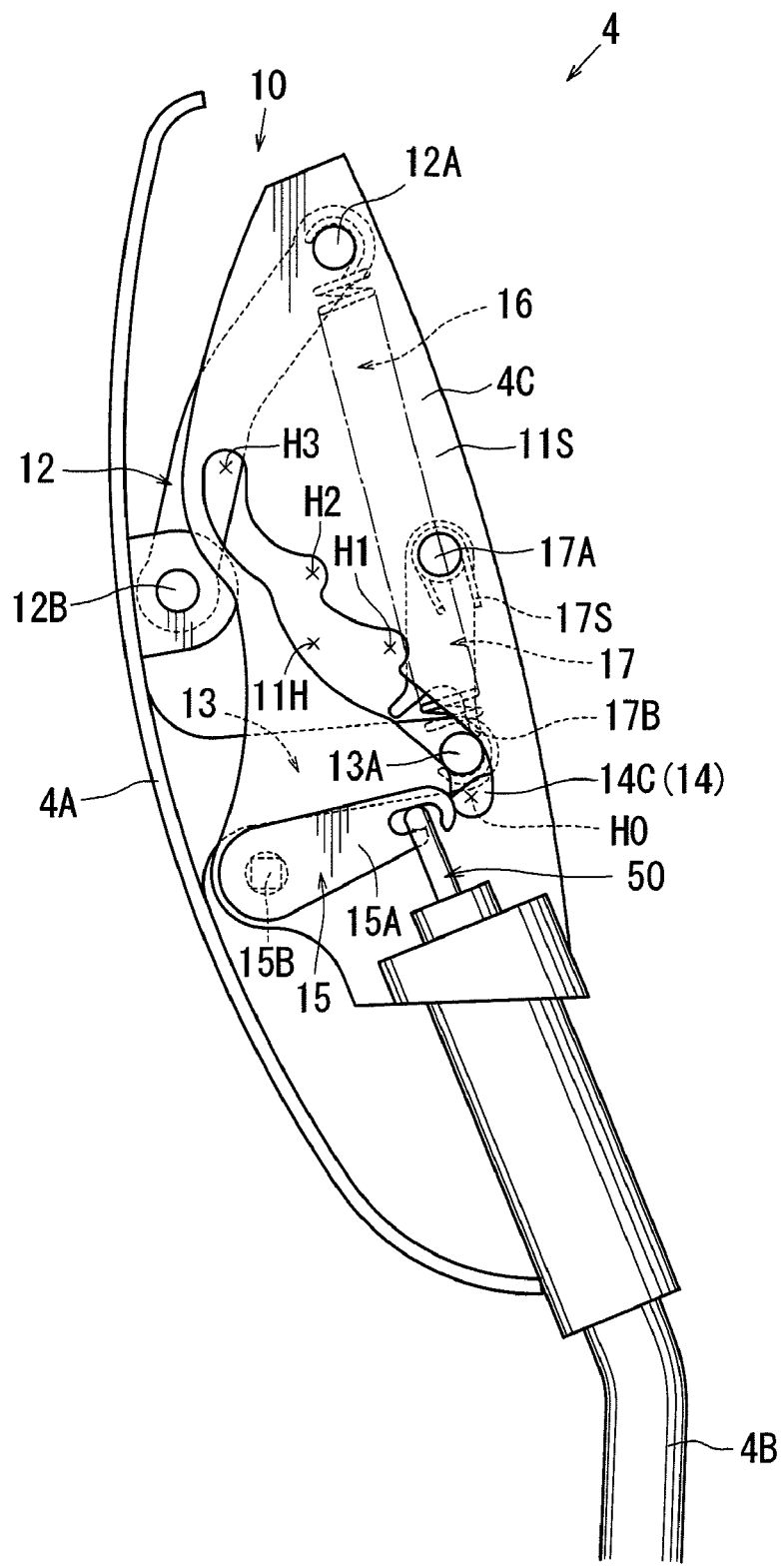
FIG. 10 is a side view, which illustrates a condition in which the support portion of the headrest is moved toward the initial position while it is guided.

As shown in FIG. 10, the connection shaft 13A, when transferred to a portion closer to the lower end portions H0 and H0 while guided by the prevention levers 17 and 17, is disengaged from the receiving portions 17B and 17B. Thus, the connection shaft 13A, when transferred downwardly from the upper end portions H3 and H3 within the elongated holes 11H and 11H, is smoothly transferred to the lower end portions H0 and H0 beyond the first stopper grooves H1 and H1 and the second stopper grooves H2 and H2 while guided by the prevention levers 17 and 17, so as to not enter the first stopper grooves H1 and H1 or the second stopper grooves H2 and H2.

Further, because the connection shaft 13A is operated so as to be pressed toward the lower end portions H0 and H0 of the elongated holes 11H and 11H, the connection shaft 13A reaches the lower end portions H0 and H0 while pressing down the lower jaw portions 14C and 14C of the hooks 14 and 14 that are exposed to the lower end portions H0 and H0. As a result, as shown in FIG. 6, the hooks 14 and 14 are rotated clockwise in the drawing, so as to be placed in a postural condition in which the upper jaw portions 14B and 14B thereof are positioned over the upper side of the connection shaft 13A.

The hooks 14 and 14, when placed in the condition as described above, engage the engagement arm portions 15C and 15C, so as to be is locked again in a condition in which the connection shaft 13A is maintained in the initial position. As a result, the support portion 4A is maintained again in a condition in which it is returned to the posture of the initial position thereof, i.e., a position before it is moved forwardly.

Next, a method of using the embodiment is described.

Referring to FIG. 1, in the normal condition in which the vehicle back-side collision does not yet happen, the vehicle seat 1 is in a condition in which the support portion 4A of the headrest 4 is maintained in the posture of the initial position thereof. When the vehicle back-side collision happens, the pressure receiving portion 21 is pressed rearwardly by the seat back loading applied by the sitting person. As a result, a corresponding operational force is transferred via the operation cable 40 and the push rod 50, so that the engagement-disengagement member 15 is rotated.

Thus, the support portion 4A is released from a condition in which it is retained in the initial position. As a result, as shown in FIG. 8, the support portion 4A moves to the collision preparatory position by the biasing force of the tension spring 16. Further, the support portion 4A that is moved to the collision preparatory position can receive the head of the sitting person that is inclined rearwardly by the impact of the collision from a back-side of the head.

Thus, according to the vehicle seat of the embodiment, due to simple construction in which the support portion 4A is connected to the headrest base portion 4C and slidably engages the guide pathways (the elongated holes 11H and 11H), the support portion 4A can move from the initial position to the collision preparatory position that can prevent the rearward inclination of the head while maintaining an inclined posture of the support portion 4A with respect to the headrest base portion 4C.

Further, a stopper mechanism is provided. The stopper mechanism can prevent the support portion 4A from being pushed back even if the support portion 4A is applied with a loading from the head when the support portion 4A reaches the collision preparatory position. The stopper mechanism is constructed of an engagement structure in which the support portion 4A and the headrest base portion 4C are slidably engaged with each other. Therefore, construction for preventing the rearward inclination of the head can be simplified and rationalized.

Further, formed in the guide pathways (the elongated holes 11H and 11H) along which the support portion 4A slides are the stopper grooves (the first stopper grooves H1 and H1 and the second stopper grooves H2 and H2) that are capable of preventing the support portion 4A from being pushed back by the head. Therefore, even when the support portion 4A is moving in an advancing direction, the head can be prevented from being inclined rearwardly. As a result, such construction can be simplified.

Further, an engagement prevention mechanism (the prevention levers 17 and 17 and the torsion springs 17S) is provided. When the support portion 4A is moving in the advancing direction, the engagement prevention mechanism allows the stopper portion 4A to engage the stopper grooves (the first stopper grooves H1 and H1 and the second stopper grooves H2 and H2) on the way in an advancing movement thereof. To the contrary, when the support portion 4A is moving in a retracting direction from the collision preparatory position, the engagement prevention mechanism is capable of guiding the support portion 4A such that the support portion 4A can pass over the stopper grooves (the first stopper grooves H1 and H1 and the second stopper grooves H2 and H2). Therefore, the support portion 4A can be smoothly returned to the initial position.

Further, the guide pathways (the elongated holes 11H and 11H) extend forwardly and upwardly so as to correspond to a moving direction of the support portion 4A. Therefore, the support portion 4A can move while substantially maintaining the inclined posture thereof. As a result, a supporting posture of the support portion for supporting the head can be maintained.

An embodiment of the present invention is described hereinbefore. However, the present invention can be carried out in various forms.

Figure 15:
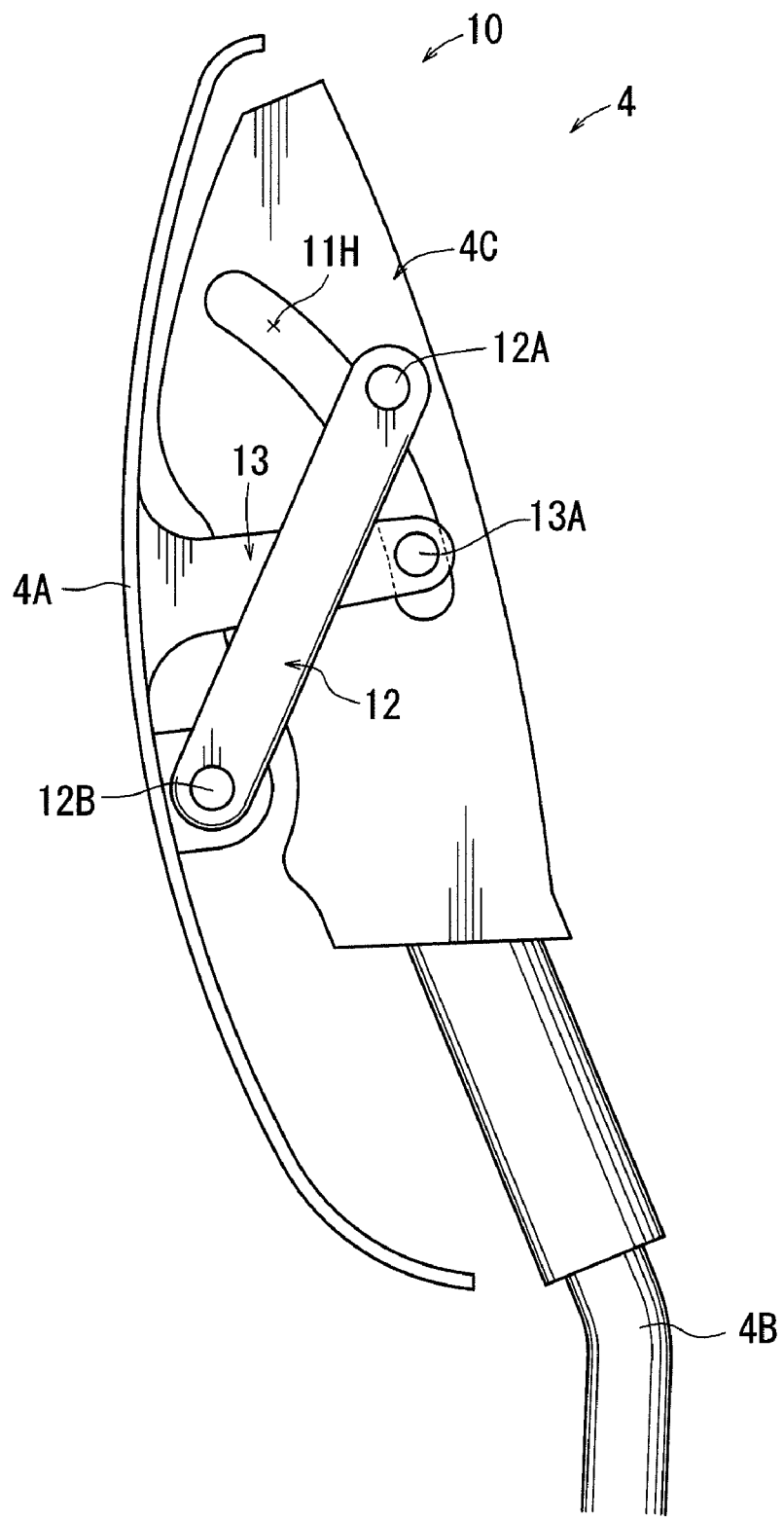
FIG. 15 is a schematic view of a modified form of a headrest moving mechanism.
Figure 16:
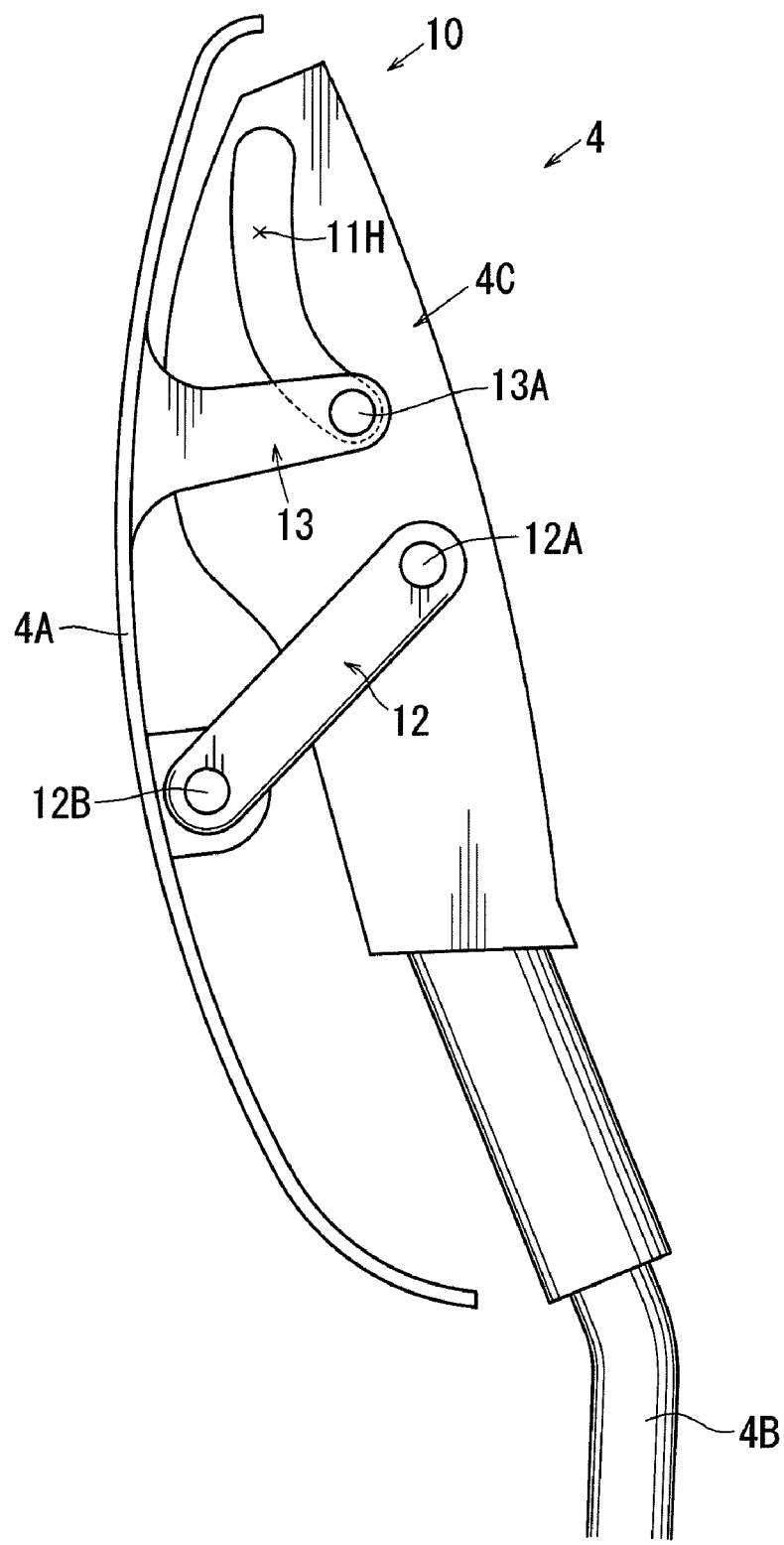
FIG. 16 is a schematic view of another modified form of a headrest moving mechanism.

For example; the linking members that link the headrest base portion and the support portion can be arranged and shaped as shown in FIGS. 15 and 16. Also, the elongated holes as the guide pathways can be arranged and shaped as shown in FIGS. 15 and 16. In particular, as shown in FIG. 15, the linking members and the elongated holes can be arranged so as to cross each other. Conversely, as shown in FIG. 16, the linking members can be pivotally connected at positions closer to a lower end of the headrest base portion, so that the elongated holes can be positioned above the linking members. Further, in these modified forms, the linking members are arranged outside of the headrest base portion. However, it is not limited to such arrangement.

Further, as disclosed in Japanese Laid-Open Patent Publication No. 2005-104259, the headrest moving mechanism can be constructed such that when the cables are moved by a desired distance, the support portion of the headrest can directly move in the advancing direction by a distance corresponding to the moving distance of the cables.

Further, the guide pathways formed in the headrest base portion are not limited to the elongated holes formed as through grooves as shown in the above-described embodiment. That is, the guide pathways may have various forms that can slidably receive the support portion. In particular, the guide pathways can be formed as bottomed grooves that are formed in the headrest base portion so as to be depressed in a width direction thereof. Further, the guide pathways can be formed as rail-shaped ribs that are formed in the headrest base portion so as to slidably guide the support portion.

Further, in the embodiment, the guide pathways extend forwardly and upwardly so as to correspond to the moving direction of the support portion. However, the guide pathways can be arranged so as to extend forwardly or upwardly. However, it must be noted that the inclined posture of the support portion can be easily changed when the support portion moves in the advancing direction or the retracting direction.

Further, the stopper grooves formed in the guide pathways can be a single stopper grooves. Conversely, the stopper grooves can be three or more stopper grooves. Further, the stopper grooves must be arranged such that when the support portion is retracted, the engagement portion (the connection shaft) of the support portion can be moved beyond all of the stopper grooves as the prevention levers are rotated.

What is claimed is:

1. A vehicle seat having a headrest moving mechanism that is capable of relatively moving a support portion of a headrest for supporting a head of a sitting person with respect to a seat back when a vehicle back-side collision is detected, so as to position the support portion closer to the head, the headrest moving mechanism comprising:
- a linking member that links the support portion of the headrest and a headrest base portion supported on the seat back to each other; and
- a guide pathway provided at the headrest base portion, the guide pathway being capable of slidably receiving the support portion to determine a postural position of the support portion of which the postural position with respect to the headrest base portion can be rotationally displaced via the linking member,
- wherein the guide pathway is shaped so as to move the support portion forwardly and upwardly with respect to the headrest base portion from an initial position in a time before the vehicle back-side collision happens to a collision preparatory position as the linking member is rotated,
- wherein the guide pathway formed in the headrest base portion is formed so as to have a concave shape depressed in a width direction of the headrest base portion, wherein an engagement portion provided to the support portion has a convex shape that is capable of engaging the concaved guide pathway,
- wherein a depressed stopper groove is formed in the guide pathway that guides the engagement portion from the initial position to the collision preparatory position, wherein the stopper groove is capable of receiving the engagement portion when the engagement portion is pushed rearwardly within the guide pathway, and wherein the stopper groove is constructed to receive the engagement portion and to prevent the engagement portion from being pushed back rearwardly when the engagement portion is pressed by a loading from the head while the engagement portion is advancing towards the collision preparatory position,
- wherein an engagement prevention mechanism is provided to the headrest base portion, wherein when the engagement portion moves within the guide pathway from the initial position toward the collision preparatory position, the engagement prevention mechanism allows the engagement portion to enter the stopper groove formed in the guide pathway on the way in an advancing movement thereof, and wherein when the engagement portion is moving in a retracting direction from the collision preparatory position towards the initial position, the engagement prevention mechanism is capable of prohibiting the engagement portion from entering the stopper groove, thereby allowing the engagement portion to pass over the stopper groove,
- wherein the engagement prevention mechanism comprises an arm-shaped prevention lever that is rotatably connected to the headrest base portion and a spring member that maintains the prevention lever in a postural condition in which the prevention lever is exposed to the guide pathway,
- wherein the prevention lever has a receiving portion at a forward end portion thereof and is capable of catching the engagement portion moving in the retracting direction, and wherein the prevention lever is capable of rotating and guiding the engagement portion caught by the receiving portion so as to move the same beyond the stopper groove, and
- wherein when the engagement portion is advancing towards the collision preparatory position, the prevention lever allows the engagement portion to move towards the collision preparatory position while pushed away by the engagement portion, and wherein when the engagement portion moves closer to the collision preparatory position, the prevention lever is disengaged from the engagement portion, so as to be returned to the postural condition in which the prevention lever is capable of catching the engagement portion moving in the retracting direction.

2. The vehicle seat as defined in claim 1, wherein the headrest moving mechanism includes a stopper mechanism, so that in a condition in which the support portion reaches the collision preparatory position and in which the engagement portion provided to the support portion is restrained from moving in an advancing direction within the guide pathway, a loading caused by rearward inclination of the head and applied to the support portion can function as a pressing force that urges the engagement portion of the support portion to further move towards the collision preparatory position.

3. The vehicle seat as defined in claim 1, wherein a plurality of stopper grooves are formed in the guide pathway so as to be positioned therealong.

4. The vehicle seat as defined in claim 1, wherein the guide pathway extends forwardly and upwardly with respect to the headrest base portion.

* * * * *